US007594276B2

(12) United States Patent
Grawrock et al.

(10) Patent No.: US 7,594,276 B2
(45) Date of Patent: Sep. 22, 2009

(54) BUBBLE-PROTECTED SYSTEM FOR AUTOMATIC DECRYPTION OF FILE DATA ON A PER-USE BASIS AND AUTOMATIC RE-ENCRYPTION

(75) Inventors: David Grawrock, Aloha, OR (US); Kevin Jones, Portland, OR (US)

(73) Assignee: Symantec Corporation, Mountain View, CA (US)

( * ) Notice: Subject to any disclaimer, the term of this patent is extended or adjusted under 35 U.S.C. 154(b) by 924 days.

(21) Appl. No.: 10/638,940

(22) Filed: Aug. 11, 2003

(65) Prior Publication Data
US 2004/0093506 A1    May 13, 2004

Related U.S. Application Data

(63) Continuation of application No. 09/047,316, filed on Mar. 24, 1998, now abandoned.

(51) Int. Cl.
*G06F 21/00* (2006.01)
(52) U.S. Cl. .................... 726/27; 726/30; 713/165; 707/9; 709/229
(58) Field of Classification Search .......... 709/203, 709/229; 713/165, 166, 189; 707/9; 726/27, 726/30
See application file for complete search history.

(56) References Cited

U.S. PATENT DOCUMENTS

| 4,757,533 A | 7/1988 | Allen et al. ............. 380/25 |
| 4,854,616 A | 8/1989 | Edmondson ............. 272/173 |
| 4,881,263 A | 11/1989 | Herbison et al. ........... 380/21 |
| 5,029,207 A | 7/1991 | Gammie ................ 380/10 |
| 5,052,040 A | 9/1991 | Preston et al. ............ 380/4 |
| 5,151,938 A | 9/1992 | Griffin, III et al. ........ 380/43 |
| 5,163,147 A * | 11/1992 | Orita ..................... 707/9 |
| 5,212,792 A | 5/1993 | Gerety et al. ........... 395/650 |

(Continued)

FOREIGN PATENT DOCUMENTS

EP    0447063    9/1991

(Continued)

OTHER PUBLICATIONS

Pietrek, M., "Peering Inside the PE: A Tour of the Win32 Portable Executable File Format", Microsoft Systems Journal, Mar. 1994, pp. 15-34.

(Continued)

*Primary Examiner*—Gilberto Barron, Jr.
*Assistant Examiner*—Hadi Armouche
(74) *Attorney, Agent, or Firm*—Gunnison, McKay & Hodgson, L.L.P.; Serge J. Hodgson

(57) ABSTRACT

A machine system includes bubble protection for protecting the information of certain classes of files from unauthorized access by way of unauthorized classes of programs at unauthorized periods of time. The machine system additionally may have On-The-Fly (OTF) mechanisms for automatic decryption of confidential file data on a per-use basis and automatic later elimination of the decrypted data by scorching and/or re-encrypting is disclosed. The system can operate within a multi-threaded environment. The machine system additionally may have a digital signature mechanism for protecting file data from unauthorized tampering. The machine system additionally may have a volume-encryption mechanism for protecting plaintext versions of file data from exposure in events of power outages.

42 Claims, 9 Drawing Sheets

U.S. PATENT DOCUMENTS

| | | | | |
|---|---|---|---|---|
| 5,274,819 | A | | 12/1993 | Blomfield-Brown ........ 395/700 |
| 5,283,830 | A | | 2/1994 | Hinsley et al. ................. 380/25 |
| 5,369,766 | A | | 11/1994 | Nakano et al. .............. 395/700 |
| 5,394,469 | A | | 2/1995 | Nagel et al. ..................... 380/4 |
| 5,412,721 | A | * | 5/1995 | Rager et al. ................. 713/194 |
| 5,465,299 | A | | 11/1995 | Matsumoto et al. ............ 380/23 |
| 5,481,701 | A | | 1/1996 | Chambers, IV ............. 395/600 |
| 5,495,533 | A | | 2/1996 | Linehan et al. ................ 380/21 |
| 5,504,892 | A | | 4/1996 | Atsatt et al. .................. 395/600 |
| 5,563,946 | A | | 10/1996 | Cooper et al. ................... 380/4 |
| 5,584,022 | A | | 12/1996 | Kikuchi et al. .............. 395/609 |
| 5,604,803 | A | | 2/1997 | Aziz ........................... 380/25 |
| 5,606,610 | A | | 2/1997 | Johansson ...................... 380/4 |
| 5,615,264 | A | | 3/1997 | Kazmierczak et al. ......... 380/4 |
| 5,619,639 | A | | 4/1997 | Mast .......................... 395/326 |
| 5,659,616 | A | | 8/1997 | Sudia .......................... 380/23 |
| 5,699,428 | A | | 12/1997 | McDonnal et al. ............. 380/4 |
| 5,732,268 | A | | 3/1998 | Bizzarri ...................... 395/652 |
| 5,787,175 | A | | 7/1998 | Carter .......................... 380/25 |
| 5,796,825 | A | | 8/1998 | McDonnal et al. ............. 380/4 |
| 5,812,848 | A | | 9/1998 | Cohen ........................ 395/685 |
| 5,835,722 | A | | 11/1998 | Bradshaw et al. ...... 395/200.55 |
| 5,905,990 | A | * | 5/1999 | Inglett ........................ 707/200 |
| 5,933,826 | A | * | 8/1999 | Ferguson ........................ 707/9 |
| 5,953,419 | A | | 9/1999 | Lohstroh et al. ............... 380/21 |
| 6,105,069 | A | * | 8/2000 | Franklin et al. ............. 709/229 |
| 6,233,577 | B1 | * | 5/2001 | Ramasubramani et al. ..... 707/9 |
| 6,253,258 | B1 | | 6/2001 | Cohen ........................ 709/331 |
| 7,197,638 | B1 | * | 3/2007 | Grawrock et al. ........... 713/165 |

FOREIGN PATENT DOCUMENTS

| | | |
|---|---|---|
| EP | 0 667 572 | 8/1995 |
| EP | 0674253 | 9/1995 |
| EP | 0679977 | 11/1995 |
| EP | 0 778 512 | 6/1997 |
| EP | 1 066 554 | 10/2003 |
| GB | 2276965 | 10/1994 |
| WO | WO 92/20022 | 11/1992 |
| WO | WO 95/18496 | 7/1995 |
| WO | WO 97/26736 | 7/1997 |
| WO | WO 97/37316 | 10/1997 |

OTHER PUBLICATIONS

Pietrek, M., "Learn System Level Win32 Coding Techniques by Writing an API Spy Program", Microsoft Systems Journal, Dec. 1994, pp. 17-44.

Kath, Randy, "The Portable Executable File Format from Top to Bottom", Microsoft Development Network Library, Jun. 1993, pp. 28.

Pietrak, Matt, "Windows Q&A", Microsoft Systems Journal, Aug. 1995, pp. 8.

Long, David, Dan Ruder, "Mechanics of Dynamic Linking", Microsoft, MSDN Library, Jan. 1993, pp. 7.

Marsh, Kyle, "Safe Subclassing in Win32", Microsoft, MSDN Library, Jan. 1994, pp. 7.

No author, "Subclassing the Desktop and Windows of other Applications", Microsoft, MSDN Library, May 1995, p. 1.

Baker, Steve, "It's Time for 32 Bits", Windows Tech Journal, Jun. 1994, pp. 28-35.

Oney, Walter, "Mix 16-bit and 32-bit code in your applications with the Win32s Universal Thunk", Microsoft Systems Journal, Nov. 1993, pp. 30.

Bender, Steven L., "Entry-Level Network Management", Stacks, Nov. 1994, p. 12.

Bannan, Karen J. "Norton Safe on the Web Preview Release", Sep. 8, 1997, ZDNet, pp. 1-2.

Pietrek, M., "Peering Inside the PE: A Tour of the Win32® Portable Executable File Format", Microsoft Systems Journal, Mar. 1994, pp. 15-34.

Pietrek, M., "Learn System-Level Win32® Coding Techniques by Writing an API Spy Program", Microsoft Systems Journal, Dec. 1994, pp. 17-44.

Pietrek, Matt, "Windows Q&A", Microsoft Systems Journal, Aug. 1995, pp. 8.

Baker, Steven, "It's Time for 32 Bits", Windows Tech Journal, Jun. 1994, pp. 28-35.

Marsh, Kyle, "Safe Subclassing in Win32" [online], Microsoft, MSDN Library, Jan. 25, 1994, pp. 1-7 [retrieved on Nov. 2, 2007]. Retrieved from the Internet: URL:<http://msdn2.microsoft.com/en-us/library/ms997565(d=printer).aspx>.

Richter, Jeffrey, "Load Your 32-bit DLL into another process's address space using INJLIB", Microsoft Systems Journal, May 1994, pp. 13-15, 18-21, 24-38.

* cited by examiner

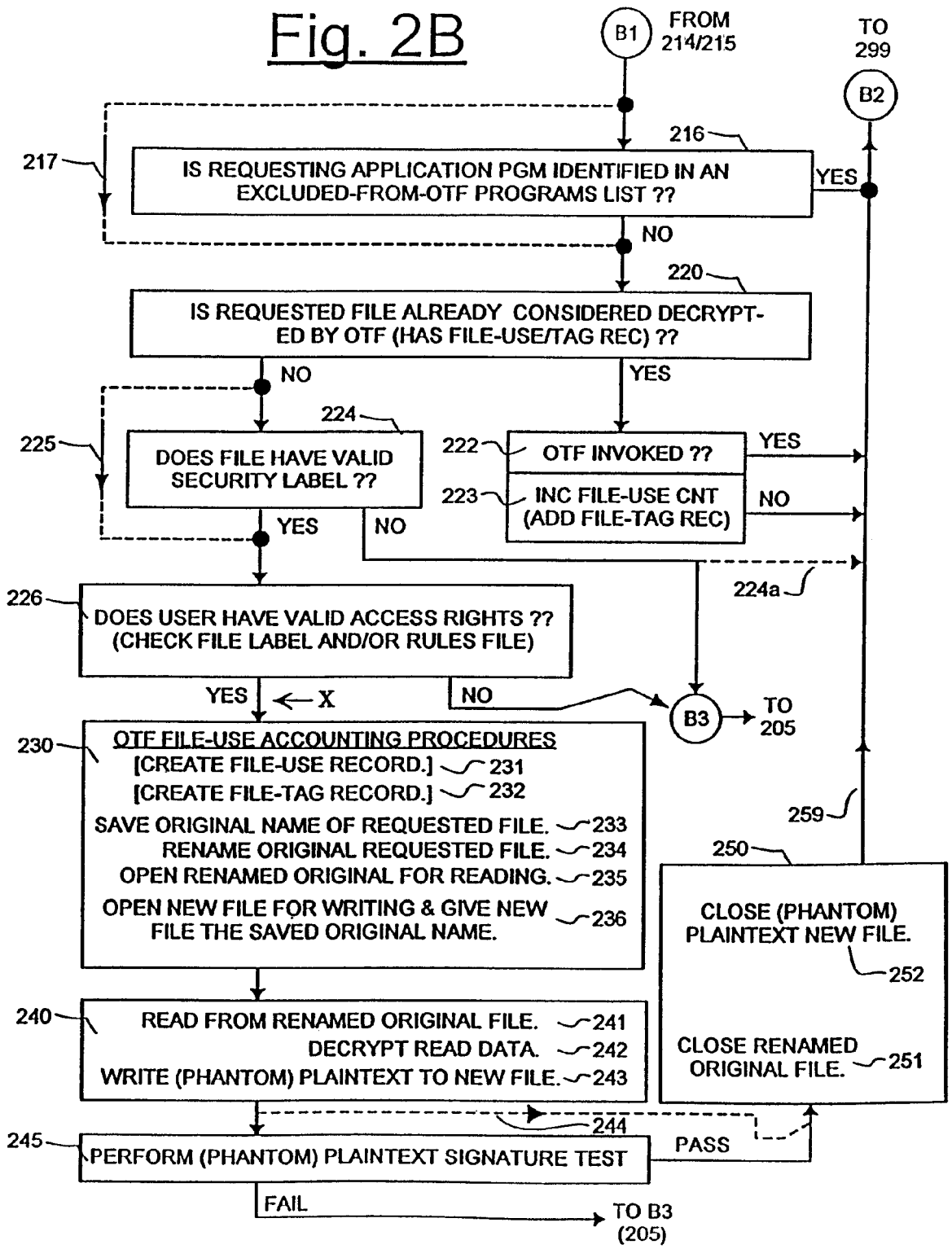

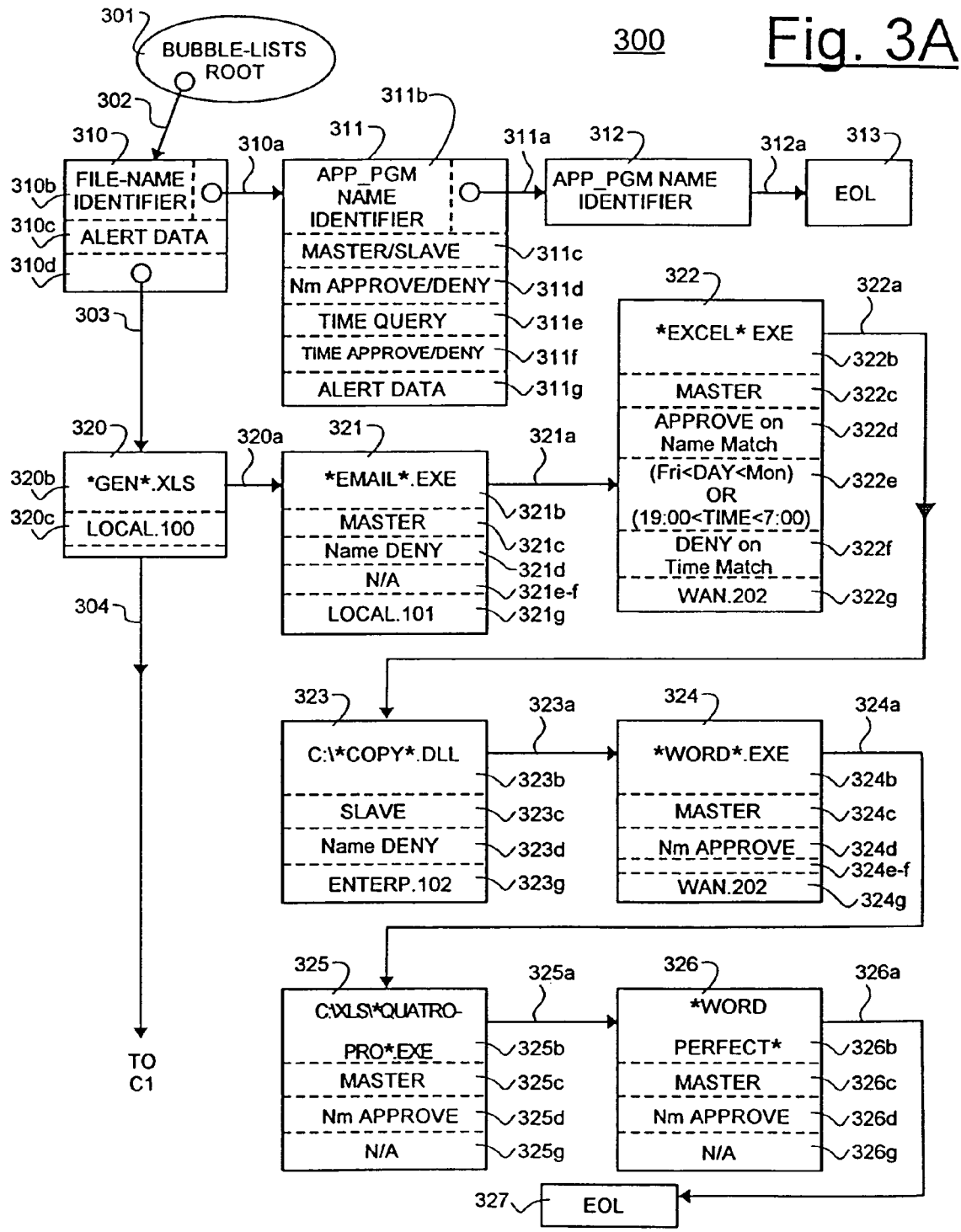

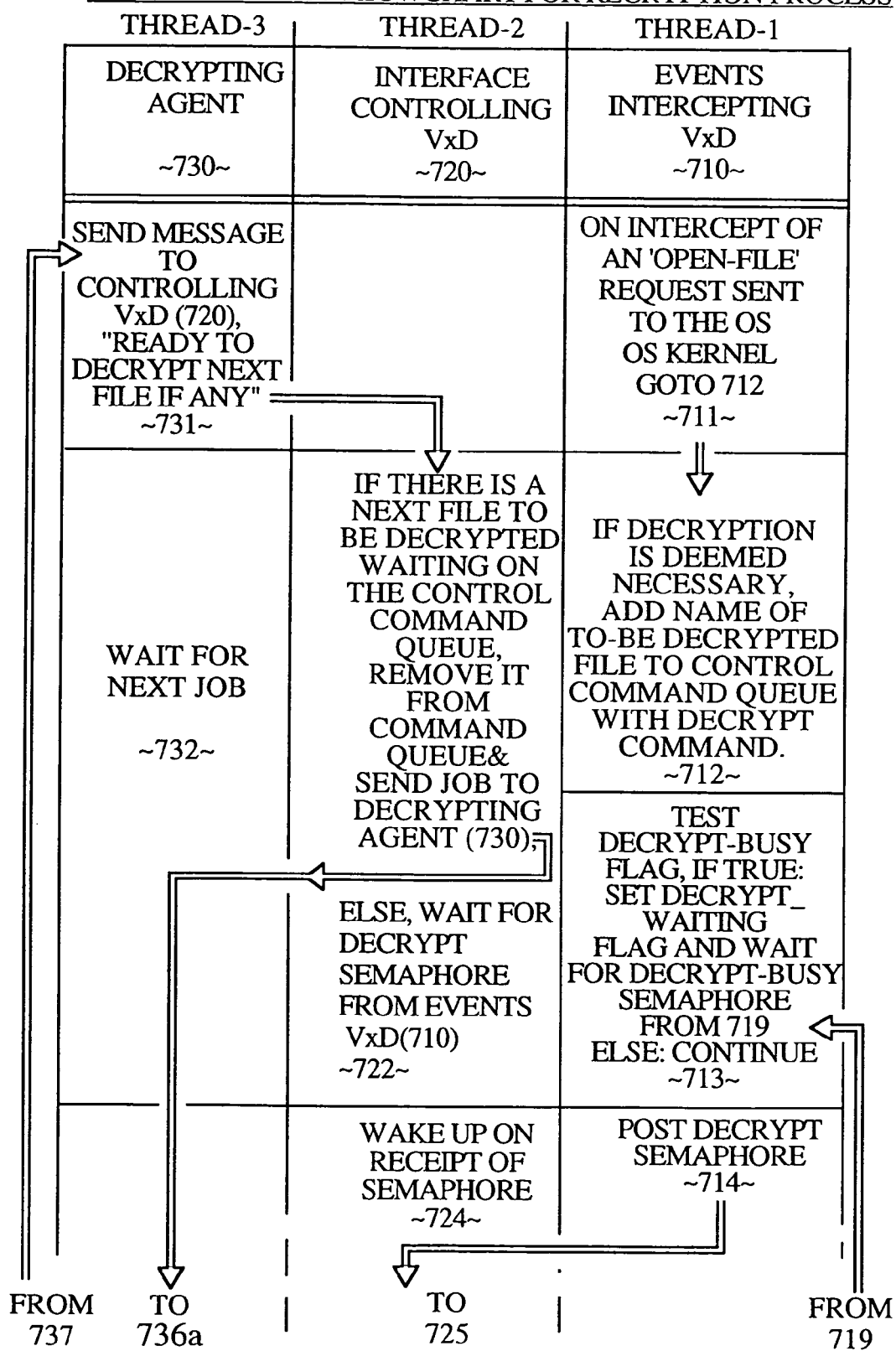

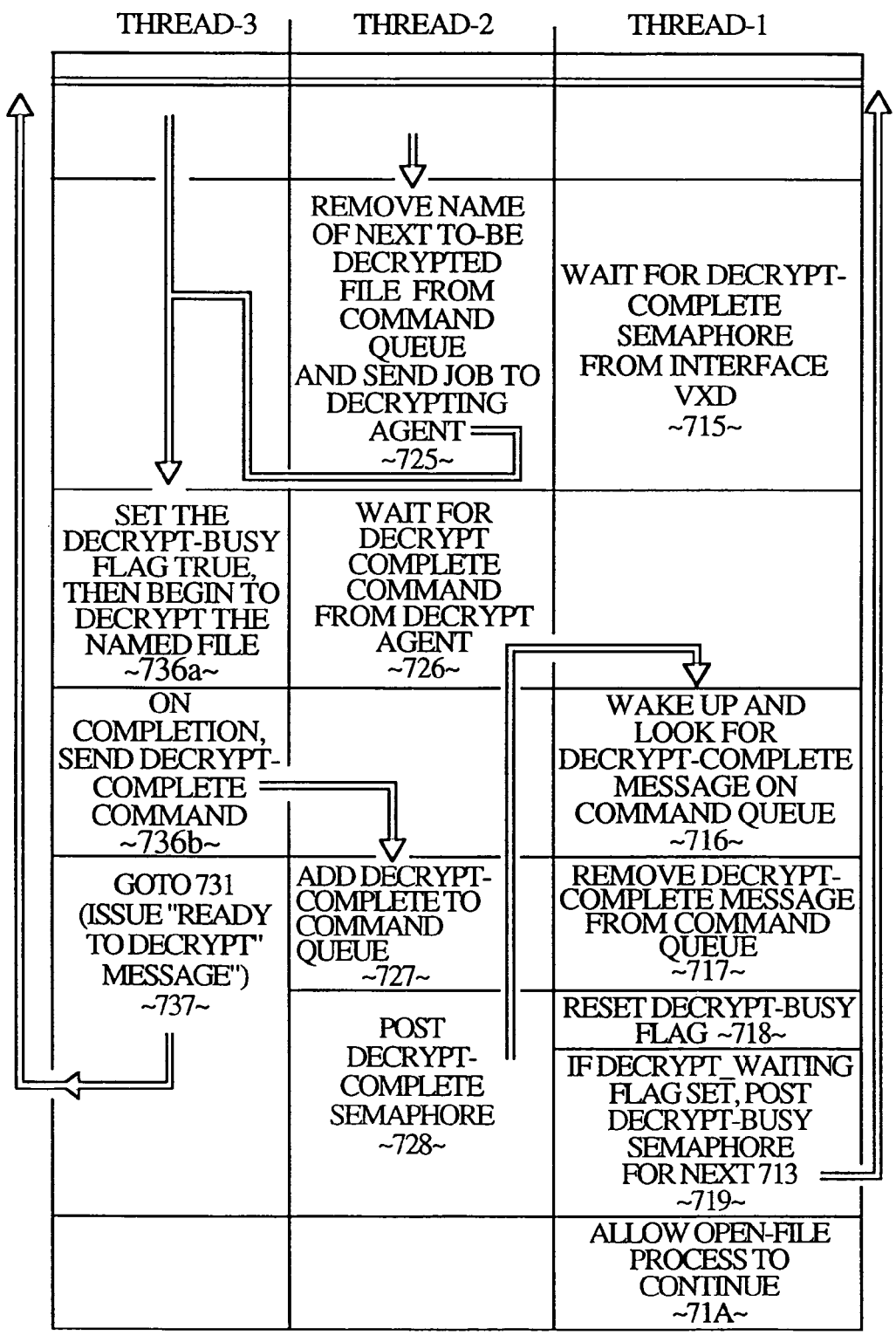

BUBBLE-PROTECTED SYSTEM FOR AUTOMATIC DECRYPTION OF FILE DATA ON A PER-USE BASIS AND AUTOMATIC RE-ENCRYPTION

CONTINUATION APPLICATION DATA

This application is a continuation of application Ser. No. 09/047,316, filed Mar. 24, 1998, now abandoned.

BACKGROUND

1. Field of the Invention

The invention relates generally to the field of securing stored digital data from unauthorized use.

The invention relates more specifically to the problem of providing an easily usable computer system that provides features such as automatic data decryption and automatic data re-encryption while operating within the context of an operating system under which application programs run in real-time and through which so-called 'applets' (e.g., ActiveX components or Java) or other downloaded programs (e.g., Trojan Horse programs) may be given temporary access to system resources.

2a. Cross Reference to Related Patents

The following U.S. patent is assigned to the assignee of the present application, is related to the present application, and its disclosure is incorporated herein by reference:

(A) U.S. Pat. No. 5,699,428 issued Dec. 16, 1997 to W. McDonnal et al and entitled, SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME, said patent being based on U.S. application Ser. No. 08/586,511 filed Jan. 16, 1996.

2b. Cross Reference to Related Patents

The following U.S. patents are assigned to the assignee of the present application, are related to the present application and their disclosures are incorporated herein by reference:

(A) Ser. No. 08/944,397 filed Oct. 6, 1997, said application continuing from above-cited, Ser. No. 08/586,511 filed Jan. 1, 1996, said application having thereafter issued as U.S. Pat. No. 5,796,825 on Aug. 18, 1998;

(B) Ser. No. 08/642,217 filed May 6, 1996 by S. Lohstroh et al. and entitled, CRYPTOGRAPHIC FILE LABELING SYSTEM FOR SUPPORTING SECURED ACCESS BY MULTIPLE USERS, said application having thereafter issued as U.S. Pat. No. 5,953,419 on Sep. 14, 1999; and (C) Ser. No. 08/518,191 filed Aug. 23, 1995 by Leo Cohen and entitled, SUBCLASSING SYSTEM FOR COMPUTER THAT OPERATES WITH PORTABLE-EXECUTABLE (PE) MODULES, said application having thereafter issued as U.S. Pat. No. 5,812,848 on Sep. 22, 1998.

3. Description of the Related Art

As knowledge of computers grows; and as use of networked computers and of digital data proliferates throughout society, the threat grows that unauthorized persons will either gain useful access to confidential, digitized information or tamper with such information.

A wide variety of materials may be stored in the form of digitized data and there may be many reasons for keeping in confidence, the information represented by such stored data, and for avoiding unauthorized changes to such data.

By way of example, stored digital data may represent financial records of one or more private persons or other legal entities (e.g., companies). The latter records may be stored as digital data in a computer that is operatively coupled to a network (e.g., the Internet). Each private entity (person or company) may wish to have his or her or its financial records kept in confidence such that the records are intelligibly accessible only to a select group of people. The method of access may be through a local keyboard or remotely via a communications network (e.g., LAN or WAN) so that a remotely located, authorized persons can quickly access the data when needed.

The above-identified U.S. Pat. No. 5,699,428 of W. McDonnal et al provides an On-The-Fly (OTF) decryption and re-encryption system which conveniently decrypts and re-encrypts file data for authorized users on an as-needed basis.

It is possible, however, that security may be inadvertently breached by the unwitting actions of an authorized user. The authorized user may have properly logged into the system and provided all the appropriate passwords which open access to a confidential file. Afterwards, the user may tap into the Internet or a like interactive, but untrustable channel. The tapped-into channel may then provide a path through which data-spying or data-tampering programs enter into the user's system. This can happen while information from a confidential file is exposed in plaintext format. Data-spying and/or data-tampering programs may then enter the system and surreptitiously transmit the exposed information and/or tamper with the plaintext data without the knowledge of the user.

By way of a more concrete example, suppose that after properly logging into the system and providing all appropriate passwords, the authorized user decides to connect via the Internet with a Web site or a like source of data that downloads ACTIVEX™ components or like kinds of 'applets' into the user's computer. As used herein, 'applet' refers to an application-like program that can execute on the user's computer with or without access limitations. The term 'applet', as used here, is not restricted here to well-behaved, JAVA™ applets that are inherently blocked from carrying out mischievous operations. (ACTIVEX™ is a trademark of MICROSOFT CORP. of Redmond, Wash. JAVA™ is a trademark of SUN MICROSYSTEMS INC. of California.) The term applies to all loadable applications, whether well behaved or not.

In most instances, the activities of the downloaded applet will be relatively benign. It may simply create an entertaining animation on the user's video monitor. There is no guarantee however, that a downloaded applet (e.g. and ActiveX component) will not at the same time stealthily attempt to transfer plaintext (exposed) information from the user's computer to an unauthorized recipient and/or that the downloaded applet will not at the same time stealthily attempt to modify plaintext (exposed) information then present in the user's computer. Such activities would constitute breaches of security. Such stealthy applet's are sometimes referred to as 'Trojan Horses'. They tempt the user with benign outer appearances while deep inside they hide potentially-harmful functionalities.

The inloading of such mischievous applets (e.g. Trojan Horses) into a user's computer is not limited to those downloaded from the Internet. Users can inadvertently open the door to confidential information in their computers by inserting a diskette or CD-ROM or like data-conveying media which has a mischievous applet on it.

Mischievous applets (e.g. Trojan Horses) do not necessarily carry out their damaging deeds at the time of inloading. They may lie dormantly in wait and spring their undesired functionalities upon the computer system at a relatively later time (e.g. midnight of January 1 of the following year).

It is desirable to have a system that provides the conveniences of On-The-Fly decryption and re-encryption (OTF recryption) while at the same time guarding against current or future attack by mischievous applets.

SUMMARY OF THE INVENTION

The invention provides an improved, machine-implemented method and apparatus for automatic decryption of file data on a per-use basis and automatic, optionally-delayed, re-encryption within the context of a multi-threaded operating system under which applications run in real-time where further provisions are made for preventing unauthorized applets or like programs from accessing information that they are not expected by the information owner to try to access either at all or within a specified time period.

Various features in accordance with the invention are listed below.

(1) Decrypt/Re-encrypt Inclusion and Exclusion Lists and/or Algorithms Identifying Access-Requesting Programs and Permissions for Same (Bubble Protection)

One feature in accordance with the invention is that one or more Program Inclusion or Exclusion Lists and/or program-approving algorithms are employed for automatically denying access to files if requested via programs (e.g., applets) whose names are not identified for approval by a program-approving list or whose names are not otherwise identified for approval by a program-approving algorithm (e.g., the program is not associated with the name extension of the requested file). Such program-directed protection is referred to herein as 'bubble protection' because only programs within an approved bubble are allowed intelligible access to files via the OTF recryption mechanism.

Use of such exclusion on the basis of the program's name, means that a file cannot be stealthily accessed for reading or tampering with by a downloaded applet that is not pre-approved on an approval list.

There can be two basic kinds of Program Inclusion Lists, permanent and temporary.

Specific programs or classes of programs that are to always be given access may be listed in a Permanent Inclusion List of Programs (PILOP).

Sometimes it is desirable to temporarily but not permanently grant certain programs a right to access confidential file data via the OTF mechanism. An example is if an applet is being downloaded from a trusted source and the source has named that to-be-trusted applet in a separately channeled, encrypted e-mail message. In such a case, the trusted applet file may be listed in an appropriate, 'Temporary Inclusion List of Programs' (TILOP) and would be later removed from that TILOP list upon the occurrence of a predefined event (e.g., termination of a security clearance for the applet-supplying source).

Control over the temporal zone during which access is approved or denied may be provided in conjunction with access approval or denial based on the identity of the program that is trying to gain access to a given file.

(2) Additional File-Label Originated Protection

In addition to excluding unauthorized programs from access to files via the 'on-the-fly recryption' mechanism, the access rights to each specific file are further guarded in accordance with the invention by a file labeling system such as disclosed in the above-identified U.S. Pat. No. 5,953,419, which is entitled, CRYPTOGRAPHIC FILE LABELING SYSTEM FOR SUPPORTING SECURED ACCESS BY MULTIPLE USERS. As explained therein, individual users are asked to provide their respective 'private' keys before being given access to a file's access key. A user may have logged into the system but not given permission to use his/her 'private' key at the time connection is made to the Internet. The stealthy, Internet-sourced applet would be blocked from access by virtue of the user not having given permission to use his/her 'private' key at the time of attempted, stealth access.

(3) Plaintext Signature Test

A third feature in accordance with the invention is that a signature test is additionally performed on a plaintext version of the desired data before permitting intelligible access via the OTF recryption mechanism. Sometimes, a stealthy applet simply tries to do damage to confidential information even though the applet does not gain intelligible access. The user should be alerted if such tampering had occurred.

(4) Volume Encryption

A fourth feature in accordance with the invention is that, in addition to the above safeguards, plaintext data is kept only in volatile memory (e.g., system RAM) and is not stored into nonvolatile memory (e.g., the system hard drive).

Bubble-protection may be practiced without OTF plus the Plaintext Signature Test. OTF plus the Plaintext Signature Test may be practiced without Bubble-protection. Alternatively, all of Bubble-protection, OTF plus the Plaintext Signature Test, and Volume-encryption may be practiced together in accordance with the invention to provide enhanced protection against security breaches.

Other features and aspects of the invention will become apparent from the below-detailed description.

BRIEF DESCRIPTION OF THE DRAWINGS

The below-detailed description makes reference to the accompanying drawings, in which:

FIGS. 2A-2B form a first flow chart showing how a file-OPEN intercept operates in accordance with the invention;

FIGS. 3A-3B shows an example of a linked Bubble list;

FIGS. 6A-6B illustrate how the file-OPEN intercept operation may work in a multi-threaded environment.

DETAILED DESCRIPTION

Figure 1:
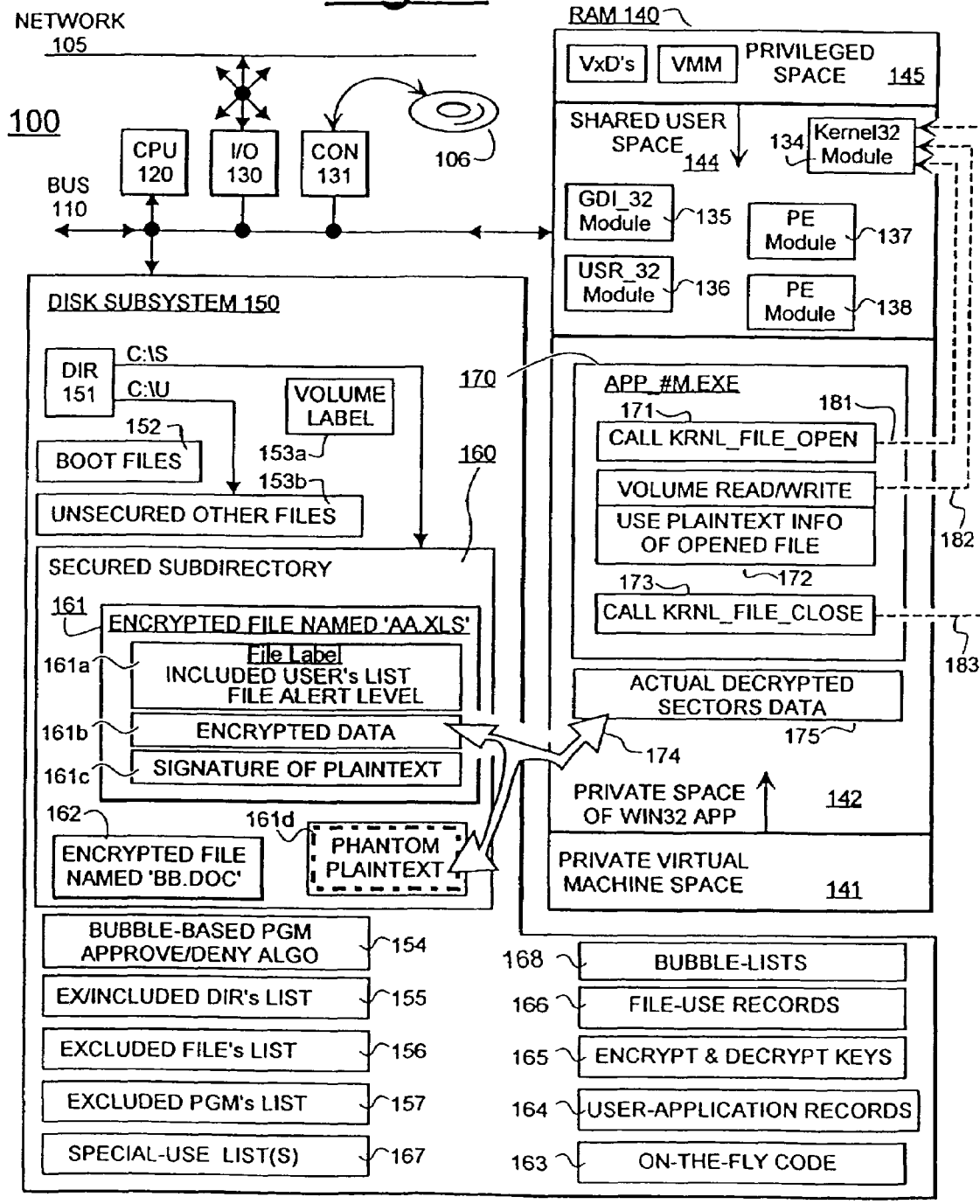
FIG. 1 is a block diagram of a computer system in accordance with the invention.

FIG. 1 is a block diagram of a computer system 100 that may be used in accordance with the invention. Computer system 100 includes a system bus 110 coupling a system memory 140 such as a random access memory (RAM) to a plurality of other system resources including a system CPU 120, system I/O module 130, an intersystem data conveyance means 131, and a nonvolatile memory subsystem 150. System I/O module 130 allows for bidirectional interconnection to a network 105 and/or to other data input and output resources.

The system memory 140 may comprise assorted types of high-speed random access devices into which immediately executable code may be stored. System memory 140 can include one or more of static RAM (SRAM), dynamic RAM (DRAM), and other like devices. Typically at least part of the system memory 140 is volatile, meaning data is lost and must be rewritten when power is lost, although it is not outside the contemplation of the invention to have system memory 140 at least partly defined by non-volatile random access memory devices such as flash EEPROM. Often the computer system 100 will include a small boot ROM (Read Only Memory, not shown) coupled to the CPU 120 for power-up and other basic re-bootings of the system. The ROM data may specify an OS-readable, unique serial number for the computer. The computer system 100 may also include a real-time clock that keeps track of actual time. In one embodiment, this real-time clock is not adjustable through normal software manipulation (e.g. access to it may be password-protected).

When system 100 boots-up, various files are automatically loaded from the disk subsystem 150 or from elsewhere (e.g., from system I/O 130) into system memory 140 to thereby create a collection of data structures within system memory 140. These data structures normally include executable instruction code that can be immediately and usefully executed by a responsive data processing unit such as the illustrated central processing unit (CPU) 120 of FIG. 1 or by non-centralized multiple data processing units (not shown) that may be further or alternatively coupled to bus 110.

The system I/O module 130 uses bus 110 for transferring data between one or more of the illustrated portions of system 100 and the network 105 or external devices. In one embodiment, the system I/O module 130 may couple the illustrated system bus 110 to a variety of external resources such as a user terminal (e.g., keyboard and monitor), a local area network (LAN), a wide area network (WAN) and/or to other external data transceiving and processing means.

The data conveyance means 131 can be defined by data transfer devices such as floppy diskette drives, tape drives, CD-ROM drives and other such means by which data recorded on transportable media 106 can be brought into system 100 or copied and carried away from system 100.

The disk subsystem 150 typically includes a drive (not separately shown) and a data storage medium (not separately shown) onto which data may be stored and from which data may be retrieved. The disk data storage medium may be in the form of a magnetic hard disk, or a floppy diskette, or a re-writeable optical disk, or other such non-volatile, randomly accessible, re-writeable media. ROM or Flash EEPROM may be alternatively used in carrying out some or all of the non-volatile data storing functions of the disk subsystem 150.

Data is recorded on the disk subsystem 150 to define a directory structure 151 and a plurality of files (not all shown) such as automatic boot-control files 152, and other files such as 153b. The group of files referenced as 153b are referred to herein as unsecured other files 153b for reasons that will become apparent shortly.

Directory structure 151 points to, and defines file storage organization of each of the stored files. By way of example, the boot-control files 152 may be defined as being contained in a root directory (such as c:\ in MS-DOS™ parlance). The unsecured other files 153b may be defined as being contained in a first subdirectory (such as C:\U in MS-DOS™ parlance). Yet other files such as the illustrated files 161 and 162 maybe defined as being contained in a second subdirectory 160 (such as C:\S in MS-DOS™ parlance).

The illustrated second subdirectory 160 is referred to herein as a secured subdirectory 160 for reasons that will become apparent shortly. One or more of the files such as 161 and 162 that are contained in the secured subdirectory 160 are referred to herein as secured or encrypted files. The secured subdirectory 160 may contain other types of files such 'hidden' files. The term 'hidden' means here that such files are not listed when a simple list-directory-contents command such as DIR (in MS-DOS™ parlance) is executed. Although not shown, the secured subdirectory 160 may temporarily contain plaintext file copies derived from one or more of its encrypted files, 161-162 by way of decryption. Storage of such plaintext data in nonvolatile form is undesirable in accordance with the invention, but may occur in some embodiments.

Each of secured files 161-162 has a name by which it is identified in the directory structure 151. By way of example, file 161 is given the name 'AA.XLS'. The last characters after the last period in the name are referred to as the name extension. A name extension such as 'XLS' may indicate the file 161 contains spreadsheet data such as that usable by the Microsoft Excel™ spreadsheet program. It may signify different kind of data. This is just an example.

By way of further example, file 162 is given the name 'BB.DOC'. The 'DOC' name extension may indicate the file 162 contains word processing data such as that usable by the MICROSOFT WORD™ program. It may signify other kinds of data. Again, this is just an example.

Programs sometimes come in the form of information-exchanging 'suites'. The data output of one program in the suite may be imported into and used by another program in the suite. For example, the MICROSOFT WORD™ program may produce numerical table data that may be importable into and used by the MICROSOFT EXCEL™ spreadsheet program. The MICROSOFT EXCEL™ spreadsheet program may produce numerical table data that may be similarly imported into and used by the MICROSOFT WORD™ program. Thus, it may be expected that the information contained in the 'AA.XLS' file 161 maybe useful to a word processing program such as MICROSOFT WORD™ or COREL WORDPERFECT™. It may further be expected that the information contained in the 'BB.DOC' file 162 may be useful to a spreadsheet processing program such as MICROSOFT EXCEL™ or COREL QUATROPRO™.

In some other kinds of cases, it is not logical for one program to read the data of another program. For example, a video animation program would not be expected to be reading financial data from a database file. More specifically, a video animation applet that has been inloaded from the Internet or a like untrustable channel, would not be expected to be reading financial data from an INTUIT QUICKEN™ financial data file and trying to electronically mail out the same at midnight. This concept is part of the 'bubble protection' scheme of the invention as will be detailed more fully below.

As seen in FIG. 1, each secured file such as 161 has a respective, secured data section 161b that contains encrypted data. The encrypted data of secured data section 161b is generally unintelligible until it is appropriately decrypted.

Each secured file such as 161 preferably has a respective file label section 161a that contains various kinds of encrypted and plaintext data. Part of that data represents a list of authorized users (INCLUDED USER's LIST) as will be detailed below. Another part of that data may define one or more alert responses to be taken if an access attempt is detected by an unauthorized program or user (FILE ALERT LEVEL) as will be detailed below.

Each secured file such as 161 preferably also has a respective digital signature section 161c that protects a plaintext version of the file's data 161b from unauthorized tampering by way of digital signature technology. The plaintext version of the file's data 161b is shown in dashed box 161d. If volume-encryption is being utilized, such a plaintext version 161d does not actually exist in the nonvolatile disk subsystem 150. Other programs are fooled into believing it does by a volume-encryption intercept 172. In such a case, the plaintext version 161d is referred to as phantom plaintext. If volume-encryption is not being utilized, then the plaintext version 161d will actually exist for temporarily in the nonvolatile disk subsystem 150.

Although not shown, secured filed 162 preferably has a corresponding structure with a respective label section 162a, encrypted data section 162b, signature section 162c, and real or phantom plaintext version 162d. Secured subdirectory 160 may have many more like files in addition to the illustrated two secured files, 161 and 162.

As further seen in FIG. 1, disk subsystem 150 stores: (a) a bubble-based algorithm 154 for providing access approval or denial to access requests presented via various kinds of programs, where such programs could include applets. Disk subsystem 150 further stores: (b) one or more lists 155 identifying directories whose non-hidden files are to be included or excluded from 'on-the-fly recryption' (OTF recryption); (c) one or more lists 156 identifying files that are to be excluded from OTF recryption; (d) one or more lists 157 identifying 'to-be-excluded' file-using programs for which OTF recryption is to be suppressed; (e) one or more lists 167 identifying 'special' file-using programs or 'special' files for which the re-encryption portion of 'on-the-fly recryption' is to be delayed until after a prespecified post-CLOSE event takes place; (f) one or more File-Use records 166 for keeping track of which still-decrypted file copies are still using by which application programs; (g) a collection 165 of encryption and decryption keys and algorithms; (h) a set 164 of User-Application records for keeping track of how many instances of each application program are still using a given, decrypted file or decrypted file-copy; and (i) instruction code 163 for instructing the CPU 120 (or a like processor means that is operatively coupled to the system bus 110) to carry out 'on-the-fly recryption' (OTF recryption) in accordance with the herein described invention. Disk subsystem 150 yet further stores: (j) one or more bubble-lists 168 that are used by the bubble-based algorithm 154 for providing access approval or denial to access requests presented via various kinds of programs.

Although not expressly shown in FIG. 1, it is to be understood that aside from the on-disk exclusion and/or inclusion lists, the OTF instruction code 163 can be constructed to permanently define certain classes of files such as executables (e.g., '*.exe', '*.com', etc.) and dynamic link-loadables (e.g., '*.DLL') as being permanently excluded from OTF recryption based on their file name extensions.

Although further not shown in FIG. 1, it is to be understood that disk subsystem 150 can store many other types of data structures, including but not limited to: (aa) device drivers (e.g., the 'virtual device drivers' or VxD's shown in area 145 of system memory 140); (bb) a disk-image of an OS kernel module (KRNL32.DLL, whose RAM-resident image is shown at 134 in area 144 of system memory 140); (cc) a disk-image of a graphical device interface module (GDI32.DLL, whose RAM-resident image is shown at 135); (dd) a disk-image of a user interface module (USR32.DLL, whose RAM-resident image is shown at 136); (ee) and further disk-images of other link-loadable modules (e.g., PE_MOD1.DLL, PE_MOD2.DLL, APP#M.EXE, whose respective RAM-resident images are respectively shown at 137, 138 and 170).

All or various parts of the data recorded on the disk subsystem 150 may be brought into subsystem 150 or copied out from subsystem 150 through a variety of data conveying means 131 or I/O means 130. The latter means 131 and 130 may include but are not limited to: floppy diskettes, compact-disks (CD-ROM), tape or the like.

Given that data in stored files such as encrypted files, 161-162 may become available to unauthorized users through a variety of ways (including the stealthy applet approaches described above), it is desirable to keep as much of this stored data in an encrypted form (ciphertext form) except for times when it is being legitimately used by authorized users. At such times, the decrypted data 175 should be kept only in volatile memory as indicated by the placement of box 175 in private space area 142 of system RAM.

Power-up or later initialization of computer system 100 may proceed as follows. In the WINDOWS95™ environment for example, an initial operating system such as MS-DOS™ resides nonvolatilely on the disk subsystem 150 and is initially loaded into system memory 140 at power-up or re-boot time. Thereafter, additional data structures are loaded into the system memory 140 using the initial system operating system (MS-DOS™) as springboard booter. The later-booted OS can define a dynamically-linked loaded system such as the MICROSOFT WINDOWS95™ operating system.

It is generally not desirable to store in an encrypted format, those files 152 that are involved with the loading of the initial system operating system (e.g., MS-DOS™). As such, the boot-controlling regions 152 of the disk subsystem 150 (which regions usually include the root directory C:\ and the automatic boot control files such as C:\AUTOEXEC.BAT and C:\CONFIG.SYS that are immediately contained therein) are preferably identified in an Excluded Directories List of region 155. Alternatively or supplementally, the same regions 152 are NOT identified in an Included Directories List of region 155 so as to prevent undesired 'on-the-fly recryption' of files immediately contained in such boot-control regions 152.

Alternatively or additionally, such boot-control files 152 can be identified in an Excluded Files List of region 156. These are files that are not subjected to OTF recryption because of such identification.

Just as it is desirable to suppress 'on-the-fly recryption' for the boot-control files 152, there may be other classes of files which are best left in an non-encrypted format on disk subsystem 150 for relatively long periods of time (e.g., for time periods substantially greater than the file usage time of any one or more application programs).

These 'unsecured other files' are generally referenced as 152 and 153b in FIG. 1. Often-used executable files (e.g., those having a '.exe' or '.com' extension) are an example of a file type that system administrators may wish to include in this category of unsecured other files 153b. Another example is a volume label 153a that holds volume encryption information.

Like the bootcontrol files 152, the unsecured other files 153b may be deliberately excluded from 'on-the-fly recryption' by storing them in a directory (e.g., C:\U where the name 'U' is arbitrarily selected here to stand for 'unsecured') that is positively identified in an Excluded Directories List of region 155 and/or by not storing them in a directory (e.g., C:\S where the name 'S' is arbitrarily selected here to stand for 'secured') that is identified in an Included Directories List of region 155.

The boot-up of the WINDOWS95™ dynamically-linked loaded environment includes installation of virtual machine manager code (VMM code), virtual device drivers code (VxD's), Win16 operating system code, and Win32 operating system code into various privileged and nonprivileged areas of system memory 140.

In the case where one or more Win32 threads are to execute within a corresponding process (there can be more than one Win32 process running simultaneously on system 100, but each Win32 process executes in its own memory context— that is, in its own private Win32 process area), the virtual address space of system memory 140 is subdivided to include: (a) a private virtual machine area 141; (b) a private Win32 process area 142; (c) a shareable user space (global space) 144; and (d) a privileged space 145.

FIG. 1 shows the system memory 140 in a state where a virtual machine manager (VMM) has been loaded into the privileged space 145 together with one or more virtual device drivers (VxD's). The virtual machine manager (VMM) defines a privileged part of the operating system environment that application programs are supposed to—but do not necessarily—honor as being user-inaccessible. The virtual device drivers (VxD's) are operatively coupled to the VMM for responding to system status messages broadcast by the VMM.

FIG. 1 further shows the system memory 140 in a state where first RAM-resident code 134 defining a Win32 operating system kernel (KERNEL_32) has been mapped from a corresponding disk region (not shown) into the shared user space 144. Unlike the VMM, the KRNL_32 module 134 defines a nonprivileged, understood to-be user-accessible part of the operating system environment.

In the particular illustrated state of FIG. 1, after the loading of the OS kernel 134, second RAM-resident code 135 defining a Win32 graphical device interface (GDI_32) has been loaded from a corresponding disk region into a lower portion of the same shared user space 144 of memory 140. Thereafter, third code 136 defining a Win32 user interface (USR_32) has been loaded from disk into the shared user space 144. Following this, additional PE (portable-executable) modules have been loaded from various library areas (not shown) of disk subsystem 150 into the shared user space 144, such PE modules PE_MOD1 (137) and PE_MOD2 (138). Like modules 137 and 138, each of the earlier-loaded blocks 134, 135 and 136 that reside in the shareable user space 144 has a portable-executable (PE) format and is expected to be in a non-encrypted, immediately usable form.

The module-occupied portion of the shared user space 144 generally grows downwardly from upper memory towards lower memory as indicated by the downwardly pointing arrow drawn in space 144. A preferred upload-destination address (Image_Base) is often defined within the disk-image of each PE module (134-138). In cases where free RAM space is available to accommodate the preferred upload-destination, the loader that maps disk-images of modules to RAM-resident images will try to accommodate the preference of each uploading module. However, in cases where the preferred RAM space is already occupied, the uploading module is usually instead relocated to a next-lower accommodating space in the shareable user space 144.

In the particular illustrated state of FIG. 1, after the OS kernel 134 and some other basic operating system modules such as GDI 135 and USR 136 have loaded, code for private application programs such as APP_#M (170) is shown to have been mapped from a respective disk region into the private Win32 process area 142. The module-occupied portion of the private Win32 process area 142 generally grows upwardly from lower memory as indicated by the upwardly pointing arrow drawn in space 142. Such upward expansion of used space is again carried out under the caveat that the loader tries to accommodate the upload-destination preferences defined in the module disk-images when such free space is available. Thus, in general, the specific location within private Win32 process area 142 for each next loaded private module may depend on which private modules were previously loaded or unloaded.

During the uploading of each module's disk-image into system memory 140, cross references of each uploading module that point to locations outside of their respective module are generally resolved at upload-time if they had not been resolved previously (that is, if they had not been resolved statically by link-time).

Assume that at some point in the history of system 100, the Win32-compliant, the executable application program named APP_#M, that had been somehow link-loaded into subregion 170 of the private Win32 process area 142, is 'launched' such that it begins to execute.

Assume that, like many other application programs, launched APP_#M 170 is coded to access data in an external data file (say for example, the file named, 'C:\S\AA.XLS' which filename is the name of the illustrated, encrypted file 161).

Application program APP_#M is not aware that the file stored under the name, 'C:\S\AA.XLS' is currently encrypted. Irrespective of this, the OS-compliant attempt by application program APP_#M to access the file named, 'C:\S\AA.XLS' will, at some level, generate a CALL to a file-OPEN service of the OS kernel (e.g., to a kernel service routine named for example, 'KRNL_FILE_OPEN') as indicated at 171. Such an interceptable call to 'KRNL_FILE_OPEN' is indicated by the drawn path 181.

As further indicated at 172, after the file-OPEN request is granted, application program APP_#M will probably try to use what it expects to be the plaintext data 161*d* of the opened file by way of one or more file-READs and file-WRITEs. The corresponding calls to OS kernel services are CALLs to cluster or sector read/write services of the OS kernel. Such interceptable calls to the primitive read/write services of the OS kernel are indicated by the drawn path 182.

As yet further indicated at 173, after application program APP_#M deems itself to be finished with its use of the data of the requested file 161, it will generally cause an interceptable CALL to a file-CLOSE service of the OS kernel (e.g., to a kernel service named for example, 'KRNL_FILE_CLOSE') to be generated at some level as indicated by the drawn path 183.

Although not expressly shown, when the execution of application program APP_#M completes, the OS kernel 134 will be asked to 'terminate' that application program.

In accordance with the invention, the interceptable CALL's to the file-OPEN and file-CLOSE services of the operating system are intercepted and acted upon to provide automatic and selective, 'on-the-fly recryption'. The interceptable CALL's to the program-LAUNCH and program-TERMINATE services of the operating system are also intercepted and acted upon to provide specialized handling for certain kinds of application programs.

Moreover, if volume-encryption is active, the interceptable CALL's to the primitive read/write services of the operating system are intercepted and acted upon to provide small plaintext samplings 175 in volatile memory in place of the on-disk phantom plaintext 161*d*. Triple arrow-headed symbol 174 represents the respective, apparent decryption of file data section 161*b* to phantom plaintext area 161*d* during the intercepted CALL to the file-OPEN service, the actual decryption of samplings of file data section 161*b* to real plaintext area 175 during the CALLs to read primitives of the OS, the actual encryption of samplings of real plaintext area 175 to file data section 161*b* during the CALLs to write primitives of the OS, and the respective re-encryption of the phantom plaintext 161*d* back to area 161*b* during the intercepted CALL to the file-CLOSE service. Details respecting special handling for the program-LAUNCH and program-TERMINATE services may be found in the above-cited, U.S. Pat. No. 5,699,428 (SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME) and these need not be repeated here.

What is of importance here, are additional steps taken to prevent rogue (mischievous) applets from gaining access to confidential information at times when the user has valid access rights to the information.

Figure 2A:
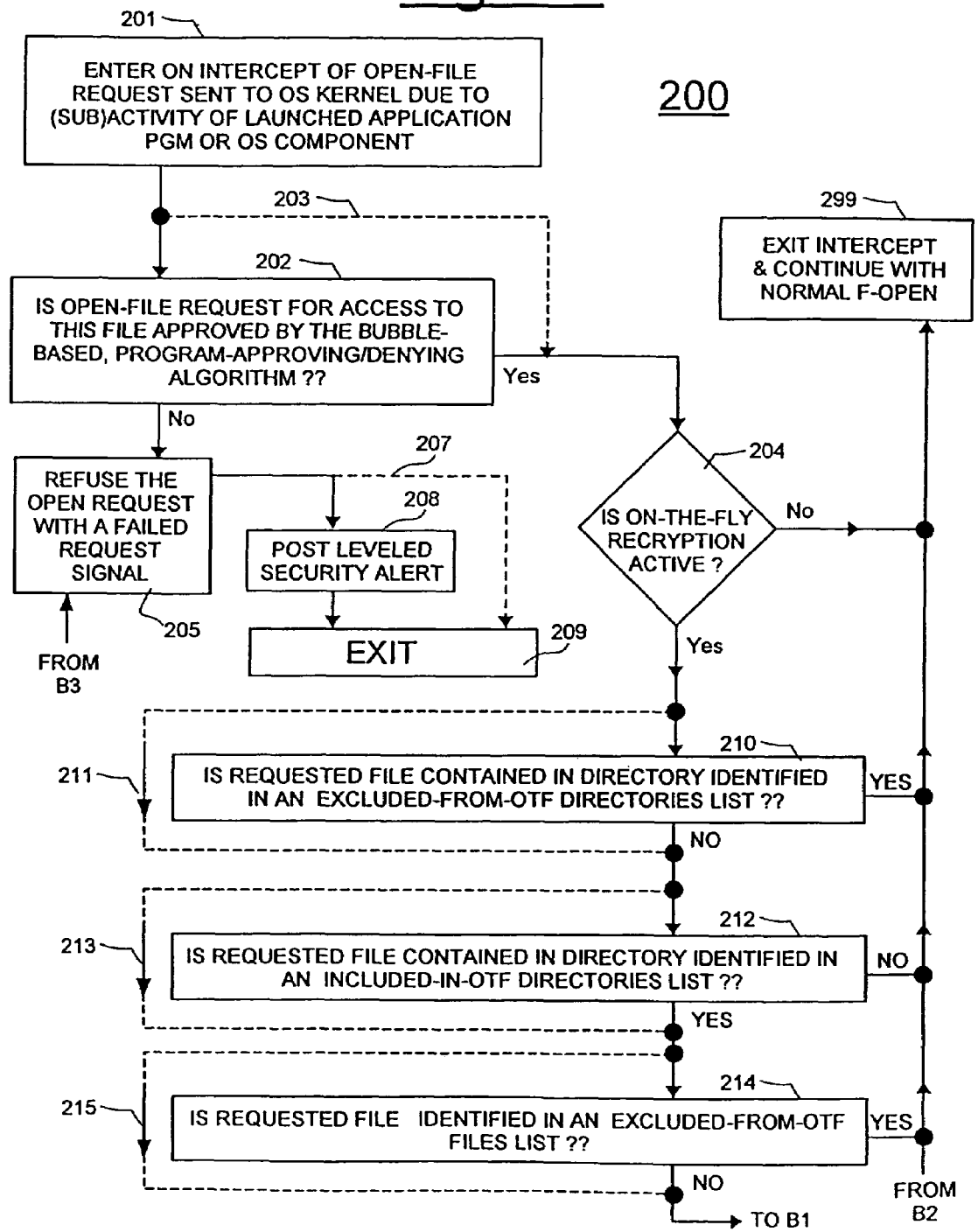

Referring to FIGS. 2A and 2B, there is shown a first flow chart depicting a machine-implemented, 'On-Open' intercept routine 200 which is carried out upon intercept of an Open-file request made to the operating system kernel 134. The OTF instruction code 163 of disk subsystem 150 is loaded into system memory 140 for causing the CPU 120 to carry out operations implementing the functions of the On-Open intercept routine 200. In one Win32 embodiment, part or all of the code for implementing the On-Open intercept routine 200 is loaded into the illustrated VxD section of FIG. 1 for execution as a virtual device driver.

Although the discussion for FIGS. 2A-2B considers the OPEN-file request as being directed to a nonvolatile memory subsystem such as disk subsystem 150, the broader concept may be seen as that of an initial access request being made for data from any kind of data-providing means (e.g., a database engine) that has individually identifiable data sets (e.g., database records) to which intelligible or other kinds of access is to be limited on the basis of one or more of the following: (1) what class of program (e.g., wordprocessing, spreadsheet, drawing, music, etc.) is asking for what class of data and when; (2) whether the requesting program and/or requested data are pre-identified participants for OTF recryption; (3) whether the requested data is to be made tamper-resistant by way of digital signature technology; and (4) whether and what kind of access-rights are provided for the logged-on user under whose activities, the requesting program is trying to access the requested data.

The On-Open intercept routine 200 is entered at step 201 upon interception of an Open-file request (or like data-access request) sent to the OS kernel either from the direct activity or a subactivity of an executing program (e.g., applet) or of another component of the OS. In the case where the OS kernel is a Win32 or like portable-executable (PE) module having dynamically link-loaded sections, the subclassing method disclosed in the above-cited U.S. application Ser. No. 08/518,191 may be used for carrying out the intercept. If the operating system kernel is of the more traditional, single-threaded type such as employed in MS-DOS™ or Win16, then conventional thinking may be employed.

Figure 3B:
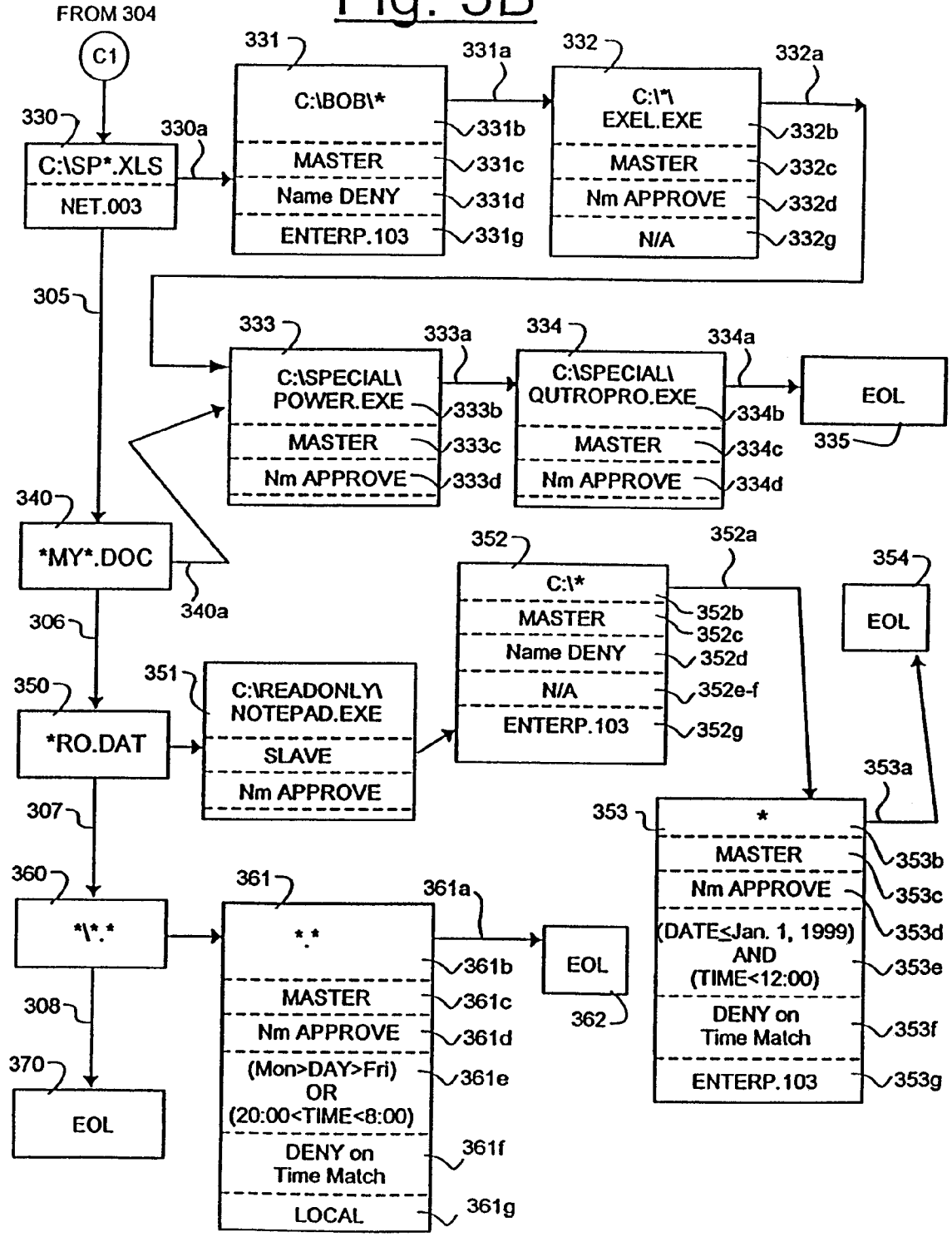
Figure 4:
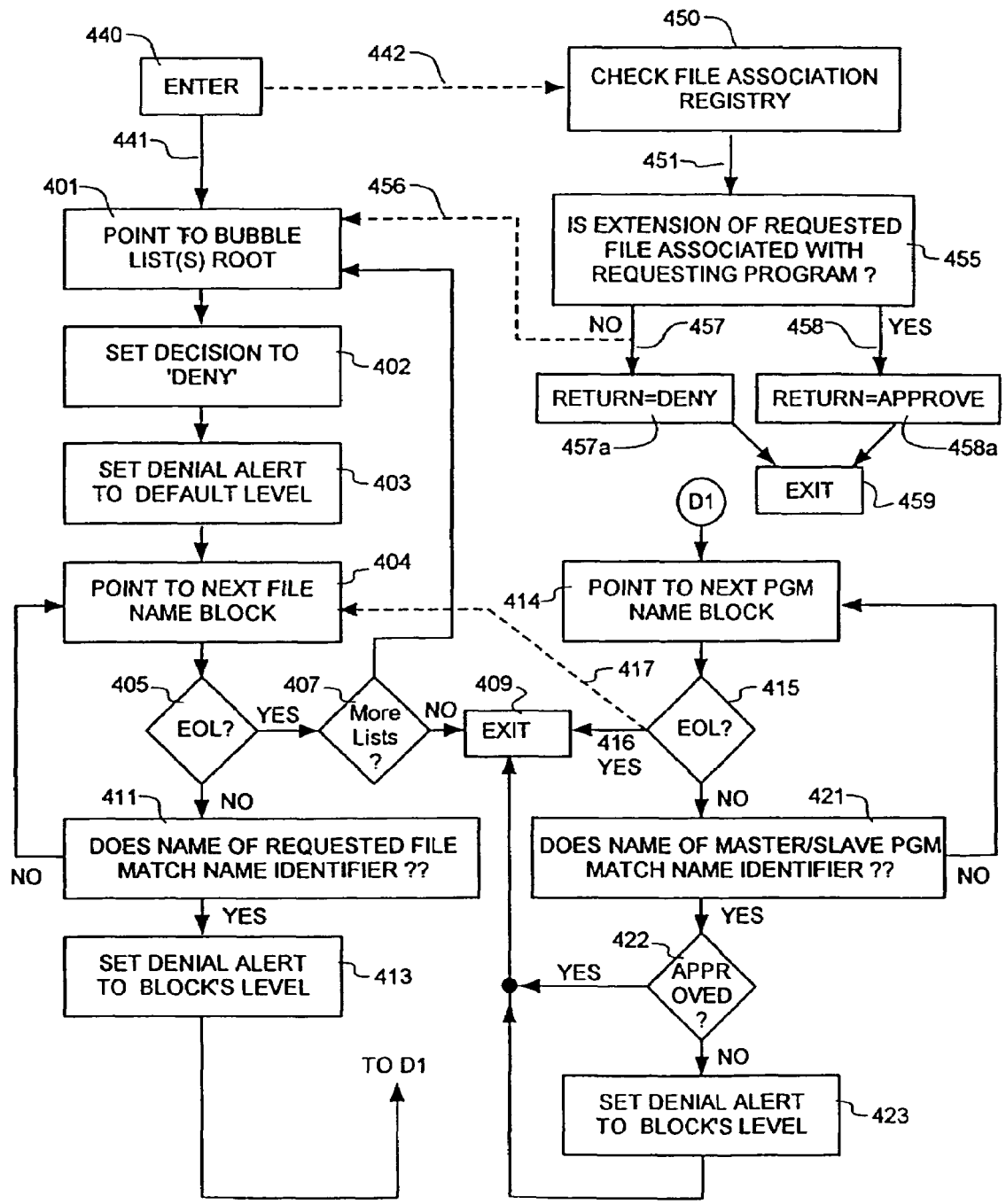
FIG. 4 is a flow chart of a bubble-list scanning algorithm.

Step 202 is an optional, bubble-protection step which may be bypassed by instead following dashed path 203. If bubble-protection step 202 is employed, the executing program or OS component of intercept step 201 is tested for bubble-based approval or denial by the program approving/denying algorithm 154. One such algorithm is shown in FIG. 4 and a corresponding bubble-list is shown in FIGS. 3a-3B. These will be detailed below.

If bubble-protection step 202 results in a denial, control passes to step 205. A failed request semaphore is passed back to the program/component whose OPEN-file request was intercepted at step 201. A leveled security alert may be optionally posted in step 208 either locally at the computer monitor and/or over the network 105 as will be explained later. Alert posting step may be instead bypassed as indicated by the dashed, alternative path 207. An exit is made at step 209 from the failed OPEN-file request. Thus, as will be understood shortly, a denial by the bubble-protection step 202 will prevent an unauthorized applet or other program from accessing the file for which it caused the OPEN-file request to issue. This will occur irrespective of whether or not OTF recryption is being used.

An approval by the bubble-protection step 202, or a bypass of such bubble-protection by using alternative path 203, leads to step 204. At step 204, a system global flag is checked to see if on-the-fly recryption is currently 'active'. If the answer to the 'OTF active?' check 204 is No, the intercept routine 200 is quickly exited by way of exit step 299 and control is passed back to the normal File-open service routine of the OS kernel so as to allow the latter to complete a normal File-open procedure without further modification or delay.

The 'OTF active?' check 204 allows system administrators to completely suppress the OTF recryption during time periods when such global suppression is desirable. For example, it may be desirable to completely turn off on-the-fly (OTF) recryption when the system is first being booted up and an initial set of non-encrypted user-executable files are being loaded into system memory 140. In one Win32 embodiment, the On-Open intercept routine 200 is defined as a virtual device driver (VxD) that automatically loads when the system boots. When this VxD 200 loads (and other VxD's for which OTF recryption is undesirable also load), the OTF flag is reset to 'inactive'. The remainder of the OTF instruction code 163 loads later in the process after the virtual device drivers load. One of the initialization routines in the later-loaded OTF instruction code 163 initializes the OTF flag to the 'active' state. If for some reason, the remainder of the OTF instruction code 163 fails to load or execute it's initialization routines, the OTF flag remains 'inactive' and the OTF VxD 200 is thereby stopped from trying to interact with the faulty remainder of the OTF instruction code 163.

If the answer to the 'OTF active?' check 204 is Yes, control flows through at least one, if not all, of subsequent OTF test steps 210, 212, 214 and 216.

One or more, but not all, of respective test steps 210, 212, 214 and 216 may be optionally bypassed by respective bypass paths 211, 213,215 and 217. The respective bypass paths 211, 213, 215 and 217 may be permanently or contingently established according to the desires of the system administrator. The sequential order of respective test steps 210, 212, 214 and 216 may be optionally rearranged to improve performance speed if it is known that one type of check eliminates more possibilities more quickly than another. The faster, more far reaching check step would then be moved to an earlier portion of the sequential string of check steps 210, 212, 214 and 216.

At test step 210, if it is not bypassed by 211, a check is made of the Excluded Directories List(s) of memory region 155 (FIG. 1) to determine whether the requested file is 'contained' in a directory that is identified as an excluded directory (a directory whose files are not to be subjected to automatic recryption).

The term 'contained', as used in the context of the excluded-directory check step 210, can have either of two meanings. Each such meaning defines an operable embodiment of method 200. According to the first meaning, 'contained' means that the file is immediately found in the identified directory rather than in a subdirectory of the identified directory. According to the second meaning, 'contained' means that the file may be found either immediately in the identified directory or in any subdirectory along one or more chains of subdirectories having the identified directory as their parent.

If the answer to the excluded-directory check step 210 is Yes, the On-Open intercept routine 200 is exited by way of step 299 and the normal file open process is allowed to continue. If the answer is No, control is passed to test step 212 or alternatively to its bypass path 213.

At test step 212, if it is not bypassed by way of optional path 213, the Included Directories List(s) of memory region 155 (FIG. 1) are consulted to see if the requested file is 'contained' in a directory identified by the consulted Included Directories List(s). The term 'contained', as used in the context of the included-directory check step 212, can have either of the alternative meanings given above for the excluded-directory check step 210 irrespective of which meaning is chosen for step 210.

Although either of test steps 210 and 212 may be employed by itself to quickly exclude a directory-contained class of files from on-the-fly recryption, it is not outside the contemplation of the invention to use both of steps 210 and 212 rather than bypassing one of them. For example, a directory may be temporarily listed in an Excluded-directories list and may thus be temporarily blocked from having its 'contained' files automatically recrypted even though the same directory or a subdirectory thereof is permanently listed on an Included-directories list that is consulted at step 212.

If the answer to the included-directory check step 212 is No, control returns to step 299. If the answer to test step 212 is Yes, control passes either to test step 214 or its corresponding bypass path 215.

At test step 214, if its bypass path 215 is not optionally taken, the Excluded Files List(s) of memory region 156 (FIG. 1) are consulted to see if the requested file is identified in at least one excluded-files list of region 156 (FIG. 1). The excluded-files lists of region 156 can include a so-called permanent exclusion list of files (PELOF, otherwise known as the 'Never-Encrypt List') and/or one or more of the so-called temporary exclusion lists of files (TELOF's). The file-identifications made in each TELOF can be cleared en masse or selectively in response to various and corresponding events within or outside of system 100. For example, one TELOF may be automatically cleared of all its identifications at periodic intervals, such as once every hour or once a day. Another TELOF may be automatically cleared each time a prespecified application program terminates, and so forth.

If the answer at the excluded-file check 214 is Yes, then control passes to exit step 299. If the answer is No, control passes to test step 216, or optionally to its bypass path 217.

At OTF test step 216 (FIG. 2B), if it is not bypassed by path 217, the Excluded Programs List of memory region 157 (FIG. 1) is consulted to see if the requesting application from which the present Open-file request evolved is listed or otherwise identified in such an Excluded Programs List.

If the answer at the excluded-program check step 216 is Yes, the intercept routine 200 is exited by way of step 299. If the answer is No, control passes to step 220.

At test step 220, it is determined if a decrypted version (real or phantom) 161d of the file data has already been created.

In one embodiment of step 220, the File-Use records region of memory 166 (FIG. 1) is scanned to see if a decrypted version (real or phantom—OTF does not know) of the file has already been created. In that embodiment, if a decrypted version of the file has already been created, a File-Use record should have been created for that file. (See below step 231.)

In the same or another embodiment, a File-Tags list within memory (see above-cited U.S. Pat. No. 5,699,428) is further or alternately scanned to see if an apparently decrypted version of the file has already been created and opened due to an earlier request of the now-requesting application program. In that embodiment, if a decrypted version of the file has already been created because another application program had earlier requested access to the file, a File-Tag record should have been created for linking that file with the earlier in time, other application. (See below step 232.)

In the embodiment that employs both File-Use records and File-Tag records, a File-Tag record should be created for linking the identity of each 'using' application program (User-application) with the identity of each plaintext, decrypted file that is to be considered 'in-use' by that specific User-application. If for some reason, it is found within step 220 that a File-Use record exists, but there is no File-Tag record yet created for linking the current application program that is requesting a file-OPEN (or more specifically, for linking the corresponding User-application record) with the File-Use record of the to-be-opened file, such a File-Tag record is now created within step 220 (or alternatively, shortly after in step 223).

Moreover, if it is further found within step 220 (for the embodiment that employs both File-Use records and File-Tag records) that a User-application record has not yet been created for linking the identity of the currently 'requesting' application program with the earlier-formed (possibly phantom) plaintext 161d of the decrypted file; such a User-application record is now created in step 220 (or alternatively, shortly after in step 223) and linked to the corresponding File-Tag record.

If the answer to the plaintext apparently-available? test 220 is Yes, control passes to test step 222 where it is determined if the current file-OPEN request issued at the behest of an OTF recryption module. In one embodiment, each File-Use record has a state-tracking section that indicates if an OTF module is currently processing the to-be-opened file. If it is (if OTF_Invoked? is true), then step 223 is bypassed and the On-Open intercept routine 200 is exited via step 299 as indicated.

If OTF_Invoked? is false (No), then in following step 223 a File-use Count is incremented. The File-use Count may be stored in region 166. In one embodiment, the File-use Count data is stored within the already created File-Use record. If a corrective update of the File-tag records had not taken place in above step 220 (because the earlier creation of the apparently decrypted plaintext was at the behest of a different application program), then in one embodiment the addition of a new File-tag record for the current application program takes place in step 223.

If the answer at the plaintext-available? test step 220 is No, control passes to step 224 or to its optional bypass path 225.

The positioning of the plaintext-available? test 220 and of response steps 222-223 in the process flow above next-described steps 224-226 presumes a single-user environment. For performance's sake, once that single user has demonstrated in a first instance that he or she has valid access rights (by way of an earlier, successful execution through ensuing steps 224 and/or 226), that user is deemed to continue to have access rights.

In an alternate, multi-user environment, steps 220-222-223 would be instead placed in the flow path at the position 'X-' between steps 226 and 230; and B1 would feed directly into step 224 and its optional bypass 225. In such a latter case, each user's access rights would be tested with each attempt at a file-OPEN rather than just the first time any one user tries to access the file. In one embodiment, a multi-user file label such as disclosed in the above-cited U.S. Pat. No. 5,953,419 (CRYPTOGRAPHIC FILE LABELING SYSTEM FOR SUPPORTING SECURED ACCESS BY MULTIPLE USERS) maybe used. Such a file label may further have a section for defining a default alert response if an attempt to access the file is made and subsequently rejected by the bubble-protection algorithm 154.

At test step 224, if it is not optionally bypassed by path 225, a so-called 'security label' area 161*a* of the requested file is read and tested. The 'security label', if utilized, is usually located at or near the beginning of each encrypted file. If the file's security label is found to be valid and in accordance with a prespecified format, control passes to step 226.

If the area in the requested file that is supposed to have a valid 'security label' does not have such a properly formatted security label, control passes to point B3.

Point B3 relays control back to step 205 of FIG. 2A. Step 205 then forces a return of a 'failed' File-open operation and exits the On-Open intercept routine 200 by way of optional step 208 and then step 209. In response, the operating system kernel 134 refuses to open the requested file and returns a 'failed file-open' message back to the requesting application program 170.

In an alternate embodiment (224*a*), rather than passing to step 205 (Force a Failed Open) on a No response to the Valid_Security_Label? check 224, the On-Open intercept routine 200 is instead exited by way of step 299. This alternate embodiment (224*a*) assumes that a file without a valid security label is inherently a plaintext file and does not participate in OTF recryption.

In the specific embodiment where the security label 161*a* of each requested file is structured in accordance with the above-cited patent of Shawn Lohstroh et al., (CRYPTOGRAPHIC FILE LABELING SYSTEM FOR SUPPORTING SECURED ACCESS BY MULTIPLE USERS) the multi-user security label has a first field that defines the type of decryption algorithm to be used for obtaining a plaintext version of the remainder of the file. By way of example, one of a plurality of algorithms such as: (1) the Data Encryption Standard (DES), (2) RSA RC4™, and (3) Blowfish may be specified by this first field.

The multi-user security label further includes a list that defines a valid user identification number for each authorized user. The OS or another interacting software module is expected to furnish a matching user identification number (User ID) with each file-OPEN request. If it does not, test 226 fails.

In an alternate single-user embodiment, the user's identification number (User ID) is defined during system boot-up and/or initialization. The security software writes a user-name/password dialog box onto the system monitor during initialization. After the user fills in the appropriate information, the security software looks up a corresponding User ID in a pre-recorded on-disk list and saves it. If there is none, the security software saves a null ID. Thereafter, the security software checks the saved User ID in test 226 against the list in the multi-user security label. If there is no match, test 226 fails.

For each user identification number defined within the multi-user security label, there is also a corresponding, encrypted key string recorded within the multi-user security label. A plaintext version of this encrypted key string defines the decryption key that is needed for decrypting the data portion 161*b* of the file below the multi-user security label. The corresponding plaintext is protected from tampering in accordance with the invention by being covered by a digital signature 161*c*.

The encrypted key string within the multi-user security label is formed by encrypting the plaintext of the needed decryption key using the authorized user's public key pursuant to a so-called public-key/private-key encryption system. (RSA is an example of such a public-key/private-key encryption system.) Accordingly, the private key of the same authorized user must be obtained in order to decrypt the encrypted key string corresponding to that user's identification number (User ID). Once the encrypted key string is decrypted with the private-key, and the plaintext of the decryption key is obtained, the data portion 161*b* of the present file can be decrypted with the thus obtained plaintext version of the decryption key and the digital signature 161*c* can be thereafter checked (in step 245) against the real or phantom plaintext version 161*d*.

If a security labeling system is not used, bypass path 225 is instead taken.

At step 226 a check is made of the requesting user's right to access the requested file. Such a right's check can be carried out in multiple ways. If a file security labeling system is used, the user identification number of the current file requester (obtained from the OS) can be compared against the list of authorized users within the file's security label to see if there is a match. Also if the multi-user file label system such as disclosed in the above-cited U.S. Pat. No. 5,953,419 (CRYPTOGRAPHIC FILE LABELING SYSTEM FOR SUPPORTING SECURED ACCESS BY MULTIPLE USERS) is used, that inherently performs a user's rights test when the user is asked to supply his or her private key.

Alternatively or additionally, other security tests can be performed in step 226 as deemed appropriate to determine whether the requesting user and/or the requesting application program have valid access rights.

If the result at the access-rights verification step 226 is negative (No), then control is passed to point B3 where the intercept routine forces a 'failed file-open' to occur.

If the result at the access-rights verification step 226 is instead positive (Yes), then control passes to a decrypting process such as that of steps 230, 240, 245, 250 and a decrypted version 161*d* of the requested file data is made available to the authorized requestor. If volume-encryption is being used as an additional protection, the OTF software is not aware of the same because volume-encryption occurs at a more primitive level (e.g., sector reads and writes). The OTF software is fooled into believing there is a real plaintext version of the file data even though that data 161*d* may instead be phantom.

In steps 230, 240, 245, 250, a preferred file-renaming procedure is undertaken in order to avoid re-encryption of apparently decrypted plaintext 161*d* where not necessary. Alternative approaches to decryption can of course be used instead.

At the start of step 230, in portion 231, a new File-Use record is preferably created and its File-Use Count is initialized to 1. (Execution of substep 231 is optional and may be bypassed if File-use records are not being employed.)

Thereafter, at portion 232, if a File-Tag record had not been previously created for linking the identity of the calling application program and with the identity of the requested file, such a File-Tag record is preferably now created and inserted in a File-Tags linked-list. (Execution of substep 232 is optional and may be bypassed.)

Thereafter, at portion 233, the original name (e.g., 'AA.XLS') of the requested file (e.g., 161) is saved. The name is preferably saved as part of the original pathname of the file in the just-created File-Use record. The name may be alternatively stored in any other convenient, nonvolatile memory area for safekeeping. Also, a 'current state' field of the file's corresponding File-Use record is set to indicate a 'Rename Still in Progress' state for that file.

Thereafter, at portion 234, the original stored data of the requested file is renamed. This is done by accessing the disk subsystem directory 151 and overwriting the original file name (e.g., 'AA.XLS') with a unique new file name (e.g., 'JAN__1__98.001').

In one embodiment, the unique new file name is selected as follows. The current time and/or current date is used to generate a unique alpha-numeric string (e.g., 'JAN__1__98.001') conforming to the file-naming protocol of the operating system (e.g., in MS-DOS™ the string would conform to the 8.3 format, while in MICROSOFT WINDOWS95™ the string may be a 'long' file name). The generated string is compared against all other file names listed in the corresponding directory of the requested file. If there is a collision (a pre-existing same name), a numeric portion of the generated string is incremented or decremented by a small value such as one (±1) and the collision test and revise procedure is repeated until there is no collision. Then the non-colliding unique alpha-numeric string (e.g., 'JAN__1__98.002') is used as the new name for the original stored data.

Thereafter, at portion 235, the renamed original file (e.g., 'JAN__1__98.002') is opened for reading.

To prevent the recursion problem mentioned above, namely, that the File-open request sent by the intercept program 200 at step 230 (e.g., OPEN JAN__1__98.002) will itself generate multiple invocations of the same intercept program 200, any of the quick-exit methods depicted by steps 210, 212, 214 and 216 may be used.

In one embodiment, the Open-file intercept routine 210 is permanently listed on the excluded programs list 157 (FIG. 1) to thereby force a Yes answer for the excluded-program check step 216 of FIG. 2B. When step 230 outputs one or more open-file requests to the OS kernel 134, the open is carried out with minimal delay.

Alternatively, or additionally, because in step 222, the 'current state' field of the corresponding File-Use record is checked to see if the file is being currently processed by an OTF module; if for some reason the earlier check points do not block the intercept of the OTF-originated OPEN from proceeding too far, when step 222 of the secondly invoked Open is executed, it forces an exit without increment through step 222 (because OTF_Invoked if found to be true).

The 'current state' field is reset to the 'OTF Handling Complete' state at the completion of step 250. 'OTF Handling Complete' produces a false (No) answer for the OTF-Invoked? test of step 222.

As next indicated at portion 236, a new file is created and opened for writing thereto. The new file is given the original filename (e.g., 'AA.XLS') that had been saved at step 233.

Upon entrance into section 240, the indicator 'Decrypt Still in Progress' is set true.

In portion 241 of section 240, encrypted text is read from the renamed original file (e.g., 'JAN__1__98.002'), it is decrypted (242), and the resulting plaintext is written (243) either actually or phantomly (if volume-encryption is active) into the new file. The decryption method may be in accordance with a wide variety of encryption/decryption methods including, but not limited to, DES, RSA RC4™, and Blowfish. The appropriate decryption key may be obtained using a variety of security methods including the above-mentioned method of encrypting the decryption key with the authorized user's public encryption key.

Step 245 is optional as indicated by the dashed, alternate path 244. If step 245 is used, a digital signature test is performed on the real or alternatively phantom (if volume-encryption is active) plaintext version 161c. The digital signature is stored in section 161c (FIG. 1). As known in the art, digital signature may be performed by applying a private encrypting key (such as under asymmetric RSA) to the to-be-signed data or to a hash of such data. A corresponding public key is afterwards used to authenticate the signature by comparing the decrypted signature (the version decrypted with the public key) against the stored data or a hash thereof. In one embodiment, the last authorized user to edit the file is defined as the master of the file 161 and his/her private/public key pair is used respectively to sign and authenticate the plaintext. In an alternate embodiment, the private/public key pair of the system administrator is used respectively to sign and authenticate the plaintext. The private/public key pair of another entity may yet alternatively be used to respectively to sign and authenticate the plaintext.

If signature test 245 is passed, control is afterwards transferred to step 250. If signature test 245 fails, control is next given to point B3 which exits by way of step 205 (refusal of the file-open request).

At the start of subsequent step 250, the 'current state' field for the file is reset to the 'Update of Directory Attributes Still in Progress' state. Then within step 250 the renamed original file (e.g., 'JAN__1__98.002') is closed (251). The new file that contains the apparently decrypted plaintext is also closed (252).

At the end of step 250, return path 259 passes control to the routine exit step 299 and the operating system is allowed to continue with a normal file-open procedure. In this case, the normal file-open procedure will open the just-created, apparently-plaintext new file rather than the renamed original file (e.g., 'JAN__1__98.002'). The calling application program APP_#M 170 will be unaware of the fact that the file information it had requested was originally encrypted and had been apparently decrypted by the OTF software. If volume-encryption is active, the OTF software will be unaware of the fact that the plaintext file named 'AA.XLS' had not been created in plaintext form although the OTF software thinks that had been done. Instead, 'AA.XLS' will be covered by the volume key, where the volume key is secured in the volume label (153a of FIG. 1) or elsewhere.

Referring back to FIG. 1, in section 172 of application program APP #M, the generated, and apparently-plaintext information within the new 'AA.XLS' file created at step 243 (FIG. 2B) is processed in accordance with instructions contained within application program section 172.

If volume-encryption is active, primitive read and write operations will be intercepted and the actually-decrypted data will be placed in volatile memory area 175 rather than in nonvolatile area 161d.

When application program APP_#M 170 finishes using the apparently-plaintext information, program 170 will usually generate a request for a File-CLOSE operation as indicated at 173. A response to such a file-CLOSE request 173 is detailed in the above-cited, U.S. Pat. No. 5,699,428 (SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL-TIME) and need not be repeated here.

In one case of such usage, where APP_#M 170 is the only application that has requested an opening of the encrypted file (e.g., of the encrypted file originally named 'AA.XLS' and stored at 161), and the usage of the apparently-plaintext information at 172 did not involve any modification of the plaintext information, the response to the File-CLOSE request 173 is to scorch the apparently-plaintext file and to change the name of the renamed original file (see step 230) back to its original name (e.g., change 'JAN__1__98.002' back to 'AA.XLS'). In this way, unnecessary re-encryption is avoided.

FIGS. 3A-3B provide an example of a bubble-protection list 300 that may be used to provide the bubble protection portion (202 of FIG. 2A) of the present invention. Bubble-protection list 300 may be a linked list which is accessed by way of a root area 301 that contains a first pointer 302 to a first file-name identifying record 310.

A general format for a file-name identifying record is shown at 310 and more specific examples are provided at 320, 330, 340, 350, and 360. As seen at 310, each file-name identifying record includes a first pointer 310a to a branch list of one or more program-name identifying records, 311, 312, etc. The illustrated first branch ends with EOL record 313.

Each file-name identifying record 310 further includes a file-name identifying section 310b. The file-name identifying section 310b defines one or a class of file-names for which access requests are to be responded to either positively or negatively with respect to one or more request-causing programs. The MS-WINDOWS95™ protocol wherein asterisks (*) are used for multi-character wild cards {including no characters} and question marks (?) are used as single-character wild cards may be used. The example at 320b ('*GEN*.XLS') accordingly identifies the class of file-names that each include the three character string, 'GEN' and may be followed by zero or a larger string of other characters, and ends with the extension, '.XLS'. If the name of the requested file matches the file-name identifying section 310b (for example 'C:\COMPNAY\GENERAL_LEDG.XLS' matches with '*GEN*.XLS'), then first pointer 310a is followed to test for a possible match with the request-causing event (the request causing program, and/or the timing and/or source location of the request).

In the next record 311 of the followed branch (310a), the program-name identifying section 311b defines one or a class of program-names which may have been either directly or indirectly responsible for the current file access request. The WINDOWS95™ pathname search protocol is again used. Thus in the more specific example of 322b, any program whose pathname satisfies the query string, '*EXCEL*.EXE' would provide a name-identity match. The response to a name-identity match condition, APPROVE or DENY is stored in section 311d.

Section 311c provides a type of match qualifier. If the matching program name must be the directly responsible cause (the immediately-proximate cause) of the current file access request, then section 311c contains a SLAVE designation, meaning the matching program is not a master over a consequential other program that actually supplied the current file access request. If the matching program name can be either the directly-responsible cause or an indirect cause (a non-proximate cause) of the current file access request, then section 311c contains a MASTER designation. In the example of 322, the matched program name, '*EXCEL*.EXE' can be either a supervising (MASTER) program that called on another executable (e.g., a *.EXE or a *.DLL) that supplied the actual file access request to the OS or the direct cause. This type-of-causation match is indicated by the MASTER entry at 322c of the more specific example. Most OS's can provide the names of both the slave executable and the master program under whose supervision the slave was loaded. Section 311c (MASTER/SLAVE) determines which of these proximity-of-causation designations is to be queried for from the OS.

If the file-name identifier 310b matches and the program-name-identifier 311b matches per the MASTER/SLAVE qualification of section 311c, then section 311d is consulted to determine if the response to the name and type-of-causation matches should be an approval or a denial.

If the response-to-match 311d is a DENY, the bubble-protection algorithm may optionally post an access-denied alert. The level of that posting may be established by default in the file label 161a, which default may be overridden or supplemented by another default 310c in the file-name identifier record 310 if there is a file-name match. The default 310c in the matched filename identifier record 310 may be optionally overridden or supplemented by additional alert data 311g in the matching causation identifier record 311 if there is a program-name match. The additional alert data 311g may indicate that no alert action is to be taken for its corresponding denial instead of indicating a specific kind of alert action. Of course, if the response-to the name-match is an APPROVE such as in sample section 324d, the data in corresponding alert section 324g is not applicable (N/A).

In addition to, or as an alternative to, performing a match test for the identity of the request-causing program, causation-record 311 may include a temporal query respecting the timing of the access request as shown at 311e. The action to be taken upon satisfaction of the temporal query condition is indicated in 311f and may be an APPROVE, a DENY or a don't care. If either of name/type and temporal causation queries 311b/c or 311e generates a corresponding DENY response, then the overall response of causation-query record 311 is a DENY even if the other of the causation queries 311b/c or 311e generates a corresponding APPROVE or don't care response. In other words, a satisfied DENY overrides (vetoes) a satisfied APPROVE decision.

A more specific example is seen in causation-record 322. The name/type causation queries 322b/c test for satisfaction of the queries: '*EXCEL*.EXE' and MASTER. A logical AND satisfaction for the name/type causation queries 322b/c produces an APPROVE (based on identity match) as seen at 322d. However a temporal causation-query is further made of the access-request as seen at 322e. If the access-request is not made on a normal workday (Monday through Friday) and is not made during normal working hours (defined by example 322e as between 7:00 AM and 7:00 PM) then the temporal causation-query produces a DENY response as seen at 322f. Thus, even if the approved '*EXCEL*.EXE'/MASTER program is being used to make the file-access request, if that request is not being made during the record-defined, normal working hours, the request will be denied. Such temporal control blocks a midnight hacker from tampering with the file data even if the hacker does manage to pick the correct program.

In addition to blocking untimely attacks, the temporal causation-query part of the bubble protection scheme can be used to hold dormant, those programs which system administrators plan to activate at a future date and/or to deactivate, in time, old programs that system administrators plan to deactivate at a future date. By way of example, suppose there is a new program that is still in beta-testing but system administrators plan to implement across a large network of desktop computers once tests complete satisfactorily. The new, in-beta-test program is to replace an older program that is now being used across the network. Rather than trying to perform a bulk download at the time tests complete, the system administrators can instead trickle distribute the new, still-in-beta program across the network over time; with each copy being blocked from use by the temporal causation-query part of the bubble protection scheme until the approval date arrives. (The access-target identifying record such as 310 can have merely an asterisk (*) in its identifier field 310b in cases where the new program is to have access to all files.) When the pre-specified approval date and time arrives, all users across the network will suddenly be able to use the new program whereas before they were blocked from doing so by the bubble protection scheme. Better than that, there will be no need for a massive download of the new program across the network. The impact on network performance can be instead minimized by trickle distribution at off-peak hours. Similarly, when a pre-specified deactivation date and time arrives for an old program, all users across the network will suddenly find they are unable to use the old program whereas before they could. The reasons for timely switch over from an old program to a new one can vary. One possibility is that a new law or policy come into effect at the pre-specified date and time. The bubble protection scheme can be conveniently used implement such a timely switchover while simultaneously providing protection against attack by Trojan Horses. Needless to say, if system administrators find they are ready to approve the new program at the originally-set date and time, a simple modification to the bubble list 300 in each client workstation can reset it to a different time.

Although not specifically shown within FIG. 3A, it is also within the contemplation of the invention to employ spatial, causation-control. A request causation-querying record such as 322 may include, in addition to the causation's-name query (322b) and causation's-time query (322e), a further test for where geographically (or in terms of machine serial number or in terms of machine name) the request-causing program is executing. The OS would be queried as to the geographic execution location of the request-causing program. One example could be of the form: IF machine-serial-number of MASTER_program's executing machine is not in the range, 005765-005788, then DENY. Such a spatial, causation-query and response can be used to further block unauthorized attacks, for example from a portable computer that is spliced onto a network. The specific nomenclature to be used for bubble protection based on spatial, causation-control will vary from site to site.

As will be understood from the examples of the so-called, ALERT DATA given in FIGS. 3A-3B, if an attempt to seriously breach security is believed to have occurred, then the alert data may cause alarms to issue on an enterprise-wide or network-wide basis or locally at a specific terminal so that as many responsible entities as appropriate can respond appropriately. For example, if the denied access attempt indicates by its nature that someone or some artificial entity was trying to stealthily alter (tamper) with the general ledger or other financial accounting records of the company, this may be considered a serious attack calling for an equally-serious level of alerts (e.g. silent alarms). The entry at 323g for example, indicates that an enterprise-wide alert should issue if the corresponding name-match produces an access DENY decision (323d). On the other hand, if the denied access attempt indicates by its nature that someone or some artificial entity was incorrectly trying to access an inconsequential music-holding file from a program that does not have music-playing capabilities, such a harmless transgression would not warrant enterprise-wide alarms. Instead, the user may be quietly and privately warned only at his/her local terminal that the access attempt was denied and the reason why (e.g., 'Sorry, the MUSIC file you have tried to access is not compatible with the program you are now using'). An example of such a local-level alert is seen at 321g.

In the horizontal branch extending from box 310, if the first causation-query record 311 does not provide a usable match condition, then pointer 311a is followed to the next causation-query record 312 in the linked list branch. If an end-of-list marker (EOL) 313 is encountered at the end of the branch with no match having occurred earlier, then the default response is DENY and the alert level is that of the current default (e.g., that of field 310c).

Next-record section 310d of target-query record 310 includes a pointer 303 to a next target-query identifier record 320, which pointer is followed if the current target-query identifier record 310 does not provide a match. If an end-of-list marker (EOL) 370 is encountered in the main (trunk) linked list with no match, then the default response is DENY and the alert level is that of the current default.

Consider the example of the linked list branch starting with file-name identifier (target-query) record 320 and proceeding through branch records 321, 322, 323, . . . , to EOL marker 327. If a target file matching the target query 320b ('*GEN*.XLS') is being requested and the cause of the request is a MASTER program satisfying '*EMAIL*.EXE' (321b), then the response will be DENY based on name as indicated at 321d for the illustrated example. The temporal test fields 321e and 321f of this example are don't cares (N/A). The new alert data for the match is identified as LOCAL.101 at 321g. The DENY decision of field 321d indicates that an EMAIL program has no business trying to access a file whose name satisfies the query, '*GEN*.XLS' (320b). This might indicate for example that someone is trying to transmit by electronic mail (EMAIL), sensitive accounting data from the company's general ledger file. (The alert level may be higher than merely LOCAL.101 as illustrated at 321g. This is just an example.)

If causation-query record 321 does not provide a name match (and optional timing match), then the test is continued into causation-query record 322.

When record 322 is tested, if it is found that the cause of the access request for the target matching query 320b (for opening of a file matching '*GEN*.XLS') is a MASTER program satisfying '*EXCEL*.EXE' (322b), then the response will be APPROVE 322d provided the temporal test 322e/322f does not generate an overriding DENY. The APPROVE decision of field 322d indicates that a spreadsheet program such as on whose name matches '*EXCEL*.EXE' (322b) is generally expected to be trying to access a file whose name satisfies the query, '*GEN*.XLS' (320b) provided the access attempt occurs during normal business hours (e.g., in the span Monday-Friday between 7 AM and 7 PM). A violation of the day-of-week and time-of-day limitations might indicate for example that someone is trying to tamper with sensitive accounting data during time periods when detection is less likely. The alarm level is set high in response as indicated by the Wide-Area Network alert level seen at 322g. (The alert level maybe even higher than merely WAN.202. This is just an example.) If record 322 does not provide a match, then the causation test branch is continued into record 323.

When record 323 is tested, if it is found that the cause of the access request for the target matching query 320b is a SLAVE program satisfying 'C:\*COPY*.DLL' (323b), then the response will be DENY 323d. The idea to be conveyed by this is that the local machine user should not be invoking a file-copying primitive-function such as 'COPY.DLL'. In other words, it has been determined that 'C:\*COPY*.DLL' has no business trying to access a file whose name satisfies the query, '*GEN*.XLS' (320b). Note that the alert level data 323g for an on-match denial due to record 323 is enterprise wide (e.g., ENTERP.102).

This implies that a network or enterprise administrator will be alerted about this attempted breach of policy through the use of the local primitive-function, 'C:\*COPY*.DLL'. If record 323 does not provide a match, then the test is continued into record 324. (The temporal test fields 323e and 323f of this example are don't cares and are thus not shown.)

Record 324 is similar to record 322 with the exception that the master program is identified as '*WORD*.EXE'. In other words, it is permissible for a wordprocessing program of this name to access a spreadsheet file whose name satisfies the query, '*GEN*.XLS' (320b) in the illustrated time period. Fields 324e-f in causation-query record 324 are not shown so as to avoid illustrative clutter.

If record 324 does not provide a match, then the test is continued into record 325 where a similar concept is continued. In other words, it is permissible for a spreadsheet program of the name-form, 'C:\XLS\*QUATRO-PRO*.EXE' (325b) to access a spreadsheet file whose name satisfies the query, '*GEN*.XLS' (320b).

If causation-query record 325 does not provide a match, then the test is continued onto causation-query record 326 where a similar concept is pursued. In other words, it is permissible for an alternate wordprocessing program of the name-form, '*WORDPERFECT*' (326b) to access a spreadsheet file whose name satisfies the target-query, '*GEN*.XLS' (320b).

If record 326 does not provide a match, then the causation test branch encounters EOL marker 327. The default response is DENY and the alert level is that of the current default. This means that no authorizing match has been found in the causation-query branch of target-query record 320 and access will be denied to whatever program (or other causation event) is trying to access the targeted spreadsheet file, '*GEN*.XLS' (320b). Accordingly, if an Internet-downloaded applet tries to access a spreadsheet file, '*GEN*.XLS', and the applet's name is not matched and approved within the causation-query branch 321-326, then the attempt will be failed by the bubble protection.

Access-denying entities such as causation-query record 323 maybe provided so as to invoke special functions, like issuing an enterprise-wide alert 323g. If a special function is not needed, there is no basic purpose to including a name-based denying causation-query record such as that at 323 because the EOL marker (e.g., 327) at the end of the causation-query branch will provide the desired denial.

If the name of the to-be-opened (targeted) file does not match the query definition 320b in target-query box 320, the search continues along trunk path 304 to the next target-query box 330 wherein the file-name identifier is 'C:\SP*.XLS'. Branch path 330a takes the testing process to causation-query box 331. As indicated in box 331, no matter what the name of the access-attempting program, if it is located in the subdirectory, 'C:\BOB' (331b), it is to be denied (331d) and an enterprise-wide alert (331g) is to be issued. On the other hand, if the access-attempting program is loaded anywhere else in the C: drive, and uses the specific name EXEL.EXE as the MASTER, as indicated by the query definition 'C:\*\EXEL.EXE' of box 332, approval will be given. Thus it is seen that denial box 331 is used to exclude 'C:\BOB' from otherwise general permissions such as the 'C:\*\EXEL.EXE' of box 332. Causation-query boxes 333-334 show that approval will be otherwise given only for specially-located versions of the programs named, POWER.EXE (333) and QUATRO-PRO.EXE (334). Otherwise, file-open permission will be denied when EOL marker 335 is encountered following satisfaction of the corresponding target query 330 and nonsatisfaction of the intervening causation-queries, 331-334.

Target-query box 340 and its pointer 340a demonstrate how same branches or subbranches of a causation-query list, such as 333-335, may be redundantly used by multiple target-query tests. Note how the special exclusion of 'C:\BOB' is bypassed if the to-be-opened file satisfies the target name query, *MY*.DOC* (340).

Causation-querybox 351 demonstrates how read-only status can be conferred on certain file classed such as the '*RO.DAT' of target box 350. Only the read-only capable, SLAVE program, 'C:\READONLY\NOTEPAD.EXE' (351) may be used out of the C: drive for accessing a target satisfying the target-query *RO.DAT of box 350. If the read-only program, 'C:\READONLY\NOTEPAD.EXE' (351) is not used, access will be denied to all other causitive programs of the pathname form '*' which are located in root directory 'C:'. If such unpermitted access is attempted from anywhere else within 'C:\*' as set forth in field 352b, an enterprise-wide alert 352g is issued. If access is attempted to the target specified by box 350 from anywhere other than 'C:\*', the causation name query of field 353b (*) will be satisfied. However, the time specifications of field 353e will also have to be avoided in order to bypass the temporal denial result of field 353f. In other words, such a non-C: access attempt to target *RO.DAT before noon of Jan. 1, 1999 will be denied. For all other possibilities, when EOL marker 353 is struck, the default alert will issue with a permission denial.

Target-defining box 360 demonstrates a catch-all approval when trunk path 307 is followed. Access attempts to all other files having the name form, '*\*.*' are approved for all programs having the name form '*.*' as indicated in box 361 providing they meet the time restrictions of field 361e. However, programs that do not have a dot in their name or post their request outside the allowed time span of 361e will still be denied by EOL box 362. Access attempts to targets that do not have a dot in their file name will be similarly denied by path 308 and trunk EOL box 370.

FIG. 4 provides a combined flow chart 400 that illustrates a number of possible algorithms that may be used with bubble-lists such as that of FIGS. 3A-3B. Entry is made at point 440. In one embodiment, the algorithm (400) flows down path 441 to step 401. In an alternate embodiment, path 442 is instead first taken to step 450.

If path 442 is followed, a file-association registry is checked in step 450. The file-association registry is one used by the OS for associating registered file-name extensions with corresponding application programs. When a user tries to open a target file having a pre-registered extension (for example by double-clicking on a file shortcut icon as in WINDOWS95™), the correspondingly associated, application program is first launched and then a file-OPEN request is automatically made for the corresponding file.

Registry accessing step 450 continues along path 451 to test step 455. In step 455 it is determined whether the file-name extension (e.g., the last character string following the last period or dot in the targeted file name) is associated via the appropriate extensions registry with the requesting program. If the file-OPEN request (201 of FIG. 2A) has occurred as a result of a manual double-click on a pre-registered file, the answer in step 455 will of course be YES. However, if the file-OPEN request (201 of FIG. 2A) occurs as a result of an applet-initiated action that attempts to access a file whose name-extension is not pre-registered for the requesting applet (or subprogram used by the applet), the answer in step 455 will be NO.

Path 458 is followed if the result of test step 455 is YES. At substep 458a, the value to be returned by the following exit step 459 is set to APPROVE and the exit 459 is taken.

In one relatively simple embodiment, path 457 is followed if the result of test step 455 is NO. At substep 457a, the value to be returned by the following exit step 459 is set to DENY and the exit 459 is thereafter taken. Note that steps 450, 455, 457a, 458a, 459 can provide bubble protection without ever scanning through a bubble list such as that of FIGS. 3A-3B.

In a more-involved, alternate embodiment path 456 is followed if the result of test step 455 is NO. The algorithm then proceeds to a bubble-list scanning portion which starts with step 401.

Upon first entry into step 401, a pointer pointing to the root of a predefined first bubble list is fetched. There may be more than one such list each having its respective root pointer. Subsequent re-entries into step 401 (from step 407) may result in the successive fetching of such other pointers.

Step 402 initializes the bubble-list decision to DENY so that failure of a match will result in a general denial. Step 403 establishes a first default alert level. The first default alert level may be fetched from the list root or from the file label (e.g., 161a of FIG. 1).

Step 404 shifts down the main target-query trunk (e.g., 310-303-320-304-330- . . . 308-370) of the current list to a next file-name identifying box.

Step 405 test for the end of the main trunk (EOL? 370). If an end has been detected, then optional step 407 checks to see if there are additional lists to be searched. If yes, the next list is pointed to and control loops back to step 401 (or to 404). If no, an exit is taken by way of step 409. The returned decision is DENY by virtue of step 402. The returned alert level is that set in step 403.

If the EOL? test of step 405 produces a NO answer, the process flows to step 411. In step 411, the name of the requested file is compared against the query definition in the target-query identifier section (e.g., 310b, 320b, etc.) of the current file-name identifier box (e.g., 310, 320, etc.). If there is no match, control is returned to step 404.

If a file-name match is detected in step 411, the default alert data of section 310c (or 320c, etc.) is used as the current default level. This is done in step 413. Control then passes to step 414.

Step 414 points to the next program-name identifying or causation-query box (e.g., 311) in the matched branch. Step 415 test for an EOL marker. If such an EOL marker is detected, one option is to follow path 416 and exit with the current DENY status and alert level. Another option is to instead follow path 417 and search further down the main trunk.

If the EOL? test of step 415 produces a NO answer, the process flows to step 421. In step 421, the name of the requesting program (be it a MASTER or SLAVE as defined by section 311c for example) is compared against the causation-query definition in the program-name identifier section (311b, etc.) of the current programname identifier box (311, 312, etc.). If there is no match, control is returned to step 414.

If there is a program-name match and a MASTER/SLAVE level match in step 421, the process continues on to step 422. In step 422, it is determined by reading the APPROVE/DENY section (e.g., 311d) of the matched box, what the returned response should be (APPROVE or DENY). If the decision is APPROVE, an exit is taken by way of step 409.

If the decision in step 422 is that there is no approval, control passes to optional step 423. In step 423 (if not bypassed) the alert level from the ALERT DATA section (e.g., 322g) of the matching and denying box (e.g., 322) is acquired. An exit is thereafter taken by way of step 409. Based on what is shown in FIG. 4, those skilled in the art can further implement temporal bubble protection and/or geographic bubble protection in accordance with the above descriptions.

Of course those skilled in the art will recognize from the above that bubble-protection may be provided with control algorithms other than those based on linked lists. For example, tables with records may be used instead. The bubble protection algorithm may be varied accordingly. The denial possibility is not essential since an EOL ultimately provides a denial. Also, the causation level qualifier of MASTER/SLAVE, may be dispensed with or alternatively may be expanded to identify a range of CALL levels between the actually-requesting slave and the responsible master (if any) whose name is to be matched.

Approval maybe premised on combinatorial logic relations between multiple programs responsible for the ultimate file_OPEN request. For example: APPROVE IF MASTER='*EXEL.EXE' and ((SLAVE='*READ_ONLY.DLL') or (SLAVE='*LOCAL_COPY_ONLY.BAT')) and (Request DATE<Jan. 1, 2001), else DENY. Such combinatorial logic relations can be defined by AND/OR tree structures, tables, or other appropriate means.

Many other variations are possible. The overall basic concept is that a machine-implemented system is provided for automatically protecting the information of targeted data-providers (e.g., files) from unauthorized access by unauthorized request-causers (e.g., requesting programs) at inappropriate times (e.g., a midnight hack attack). This presumes an interceptable access mechanism (e.g., 181 of FIG. 1) through which data (e.g., 175) of an identified file (e.g., 161) is accessed and the identity of the request-invoking program is ascertainable. A bubble-control means is coupled to intercept data access attempts made through the interceptable access mechanism by identifiable programs. The bubble-control means includes some sort of affirmatively-acting and/or negatively-acting means which either affirmatively provides approval for access to the data of an identified subset of files based on the identity of one or more access-attempting programs fitting into a pre-approved class, and/or affirmatively provides denial for access to the data, again based on the identity of one or more access-attempting programs fitting into a pre-defined denial class. Temporal and/or geographic approval/denial follows a similar scheme. OTF recryption with plaintext signature authentication is an optional additional level of protection.

Figure 5A:
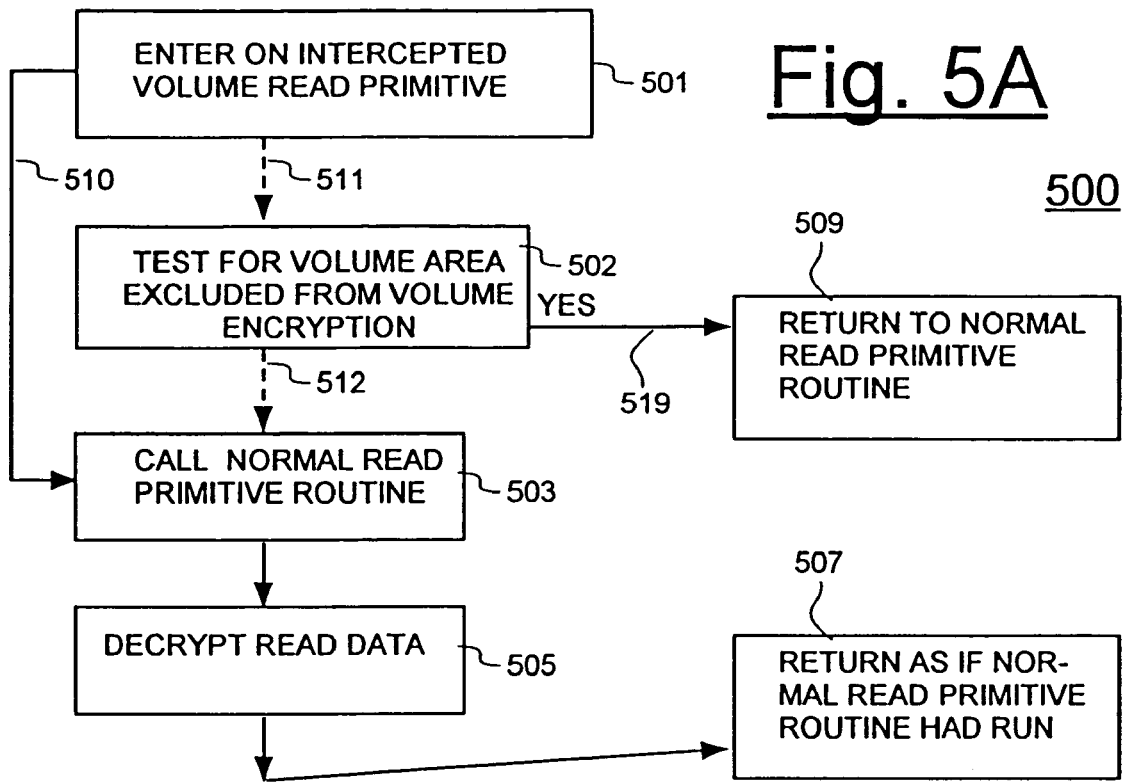
FIG. 5A is a flow chart of volume-encryption intercepts for sector read requests.

Volume-encryption is a yet further, optional additional level of protection. FIG. 5A provides a flow chart 500 for two alternative embodiments for carrying out the read side of volume-encryption. As explained above, volume-encryption is optional. When a read primitive (e.g., a disk-sector read function) of the OS is called while volume-encryption is active, the call is intercepted at step 501. Path 510 is followed in a faster embodiment while path 511 is followed in the alternative, slower embodiment. If slow path 511 is followed, a test is carried out in step 502 to determine if the read primitive is directed to an area of the volume (e.g., of the hard disk) that is excluded from volume-encryption. An example of such an excluded area would be areas 152, 153a, 153b of disk subsystem 150 in FIG. 1. If the entire platter (volume) is under volume-encryption, step 502 is not necessary and the time consumed by step 502 may be eliminated (by instead following fast path 510). If step 502 produces a YES answer, path 519 is followed to step 509. In step 509, control is returned from the read intercept routine 500 back to the normal primitive-read routine of the OS. If step 502 produces a NO answer, path 512 is followed to step 503.

In step 503 (whether reached by fast path 510 or by slower route 511-502-512), a call is made to the normal primitive-read routine of the OS. Upon completion of the normal primitive-read routine, control returns to step 505. The read data is transformed by an appropriate volume-decryption process into plaintext. Such actually-decrypted data is placed in a volatile memory area like 175 of FIG. 1.

Step 507 returns the decrypted data (e.g., 175) to the caller as if the normal primitive-read routine of the OS had run instead. The caller is unaware that volume-decryption had taken place.

Figure 5B:
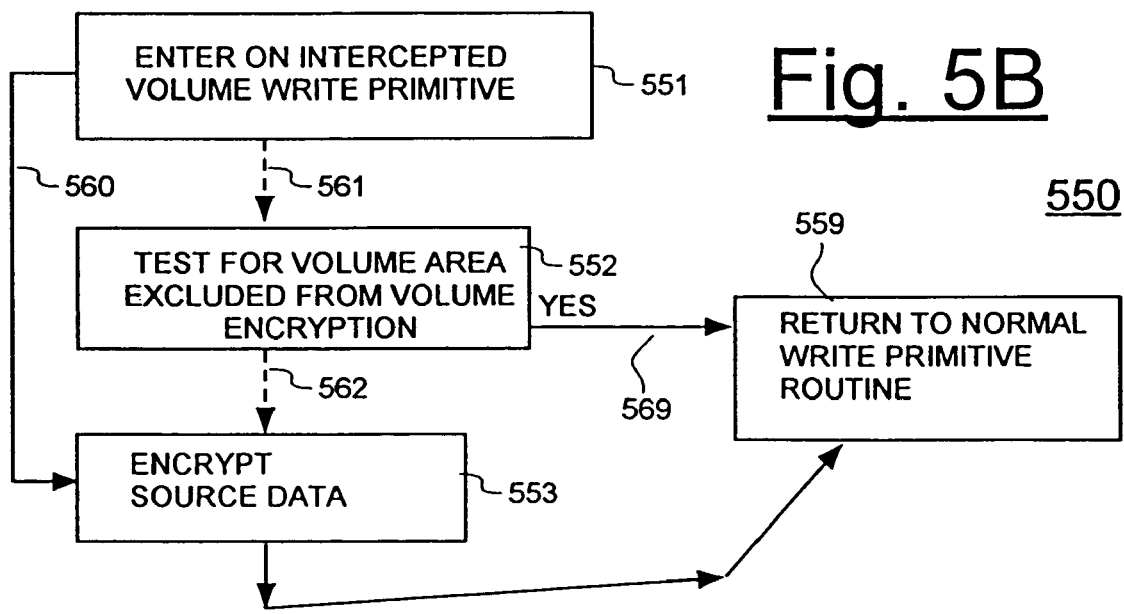
FIG. 5B is a flow chart of volume-encryption intercepts for sector write requests.

FIG. 5B provides a flow chart 550 for two alternative embodiments for carrying out the write side of volume-encryption. When a write primitive (e.g., a disk-sector or disk cluster write function) of the OS is called while volume-encryption is active, the call is intercepted at step 551. Path 560 is followed in a faster embodiment while path 561 is followed in the alternative, slower embodiment. If slow path 561 is followed, a test is carried out in step 552 to determine if the write primitive is directed to an area of the volume that is excluded from volume-encryption. If the entire platter (volume) is under volume-encryption, step 552 is not necessary and the time consumed by step 552 may be eliminated (by instead following fast path 560). If step 552 produces a YES answer, path 569 is followed to step 559. In step 559, control is returned from the write intercept routine 550 back to the normal primitive-write routine of the OS. If step 552 produces a NO answer, path 562 is followed to step 553.

In step 553 (whether reached by fast path 560 or by slower route 561-552-562), a call is made to the data encrypting process of the volume-encryption system. Upon completion, control is passed to step 559 which completes the normal primitive-write routine of the OS. The original data is thus transformed into encrypted data before the primitive write process is carried out. Such actually-encrypted data is placed in a nonvolatile memory area like 161d of FIG. 1.

Step 559 returns a write-completed message to the caller as it would in a normal primitive-write routine of the OS. The caller is unaware that volume-encryption had taken place.

FIGS. 6A-6B illustrate how a VxD embodiment of the file-OPEN intercept routine 200 works in a multi-threaded environment. Inter-thread and intra-thread semaphores and flags are used to provide communication and synchronism between: (1) an events-intercepting first VxD 710; (2) an interface-controlling second VxD 720; and (3) a decrypting agent 730.

The first VxD 710, second VxD 720 and agent 730 are shown to be running as concurrent threads each in a respective one of the three columns labeled: THREAD-1, THREAD-2, and THREAD-3. At the bottom of the execution column of each respective thread, an automatic branch is executed back to the top of the thread (back to the top of the respective execution column. Thus, for example, after the bottom step 71A (FIG. 6B) of THREAD-1 completes, THREAD-1 automatically continues its execution at its top step 711.

THREAD-1 operates in the context of an executing application program thread because THREAD-1 is invoked by interception of a file-OPEN request. Since there can be many application program threads running at the same time in a multi-threaded system, it is possible for multiple instances of THREAD-1 to be invoked at the same time. Each of THREAD-2 and THREAD-3 services one instance of THREAD-1 at a time in the below-described embodiment.

An alternate embodiment can be provided that generates fresh instances of each of THREAD-2 and THREAD-3 for each freshly invoked instance of THREAD-1. However, such an alternate embodiment would suffer the performance overhead cost of invoking two new threads (THREAD-2 and THREAD-3) with each file-OPEN rather than invoking each of THREAD-2 and THREAD-3 just one time at system initialization. (THREAD-1 is code that executes within the anyways invoked thread of an application program and thus does not constitute much additional overhead.)

Although the example of FIGS. 6A-6B is directed to the file-OPEN process, it should be apparent that a similar scheme can be used for a corresponding file-CLOSE process. In the latter process, the events-intercepting first VxD 710 works with file-CLOSE events rather than file-OPEN's; the interface-controlling second VxD 720 looks for encryption commands and flags rather than decryption commands and flags; and the agent 730 is an encrypting agent rather than a decrypting agent.

Referring to FIG. 6A, after system initialization, the decrypting agent 730 sends a message 'Ready to Decrypt Next File If Any' to the interface-controlling VxD 720 as indicated in box 731. Thereafter, the decrypting agent 730 sits waiting for a next job as indicated at 732.

At the same time, the events-intercepting VxD 710 is in a sleep mode and does not get invoked until a next open-FILE request is intercepted as it is sent from an executing application program to the operating system kernel as indicated at 711.

On the intercept of such an file-OPEN request, THREAD-1 proceeds to step 712 where it determines whether decryption is necessary for the to-be-opened file. If decryption is deemed necessary, a DECRYPT COMMAND is added to a system command queue together with the name of the to-be-decrypted file.

Referring to box 713, sometimes multiple application programs are executing in time-shared parallelism and more than one file-OPEN request maybe sent to the OS kernel at roughly the same time. To keep all threads 720 and 730 in approximate synchronism each invocation of thread 710, an interlocking procedure is carried out at step 713. A DECRYPT-BUSY FLAG (which flag is set by the decrypting agent at step 736a of FIG. 6B) is tested. If the DECRYPT-BUSY FLAG is false, that means either that the decrypting agent 730 had not yet set that flag in step 736a or that a previous invocation of the events-intercepting VxD 710 had reset the DECRYPT-BUSY FLAG at step 718 and the decrypting agent 730 had not thereafter turned around and again set that same flag at step 736a.

Upon a false DECRYPT-BUSY FLAG, the process in THREAD-1 continues to step 714 where it posts a DECRYPT SEMAPHORE for the interface-controlling VxD 720.

If, on the other hand, the DECRYPT-BUSY FLAG is found to be true in step 713, a DECRYPT_WAITING FLAG is set in step 713 and THREAD-1 idles until it receives a decrypt-busy semaphore from step 719 of a previously invoked execution of the same thread 710.

Meanwhile, in step 722, the interface-controlling VxD 720 has been scanning the command queue for a next command to execute. If there is such a command, the interface-controlling VxD 720 removes that next command from the command queue, and if it is a 'DECRYPT filename' command, the interface-controlling VxD 720 sends the corresponding job to the decrypting agent 730. Otherwise, the interface-controlling VxD goes to sleep and waits for a DECRYPT SEMAPHORE from the events-intercepting VxD 710.

Upon receipt in box 724 of the DECRYPT SEMAPHORE posted in box 714, the interface-controlling VxD 720 awakens and proceeds to step 725.

In step 725 (FIG. 6B), the 'DECRYPT filename' command is removed from the command queue and the corresponding job is sent to the decrypting agent.

In step 736a of THREAD-3, the decrypting agent 730 sets the DECRYPT-BUSY FLAG true and then begins to decrypt the named file.

In the meantime, the interface-controlling VxD 720 goes to sleep in step 726 waiting for a DECRYPT-COMPLETE COMMAND from box 736b of the decrypting agent 730.

Within this interlocking sequence of events, the corresponding invocation of the eventsintercepting VxD 710 goes to sleep at 715 waiting to wake up upon receipt of a DECRYPT-COMPLETE SEMAPHORE from box 728 of the interface-controlling VxD 720.

On completion of its decryption job, the decrypting agent 730 posts the DECRYPT-COMPLETE COMMAND as indicated in box 736b. Then it returns through box 737 to box 731 and posts the next message 'Ready to Decrypt Next File If Any' for the interface-controlling VxD 720 as indicated in box 731.

In response to the DECRYPT-COMPLETE COMMAND, at step 727, the interface-controlling VxD 720 adds a DECRYPT-COMPLETE MESSAGE to the command queue for receipt by the sleeping events-intercepting VxD 710. Then in box 728, it posts the DECRYPT COMPLETE SEMAPHORE.

In response, the sleeping events-intercepting VxD 710 wakes up at step 716 and starts scanning the command queue for a DECRYPT-COMPLETE MESSAGE which is to be received from the interface-controlling VxD 720.

When it finds the message, the events-intercepting VxD 710 responsively advances to step 717 wherein it removes the DECRYPT-COMPLETE MESSAGE from the command queue, and thereafter in step 718 resets the DECRYPT-BUSY FLAG to false.

In step 719, if the DECRYPT_WAITING FLAG had been set earlier in step 713, a DECRYPT-BUSY SEMAPHORE is now posted in step 719 for receipt by the next invocation of step 713.

Thereafter, in step 71A, the events-intercepting VxD 710 retires and allows the file-OPEN process to continue with a normal file-opening. The events-intercepting VxD 710 reawakens at step 711 upon interception of a next file-OPEN request.

The above disclosure is to be taken as illustrative of the invention, not as limiting its scope or spirit. Numerous modifications and variations will become apparent to those skilled in the art after studying the above disclosure.

By way of example, in a database system where data is routinely accessed (read from and/or written to) as integral units of finer granularity than 'files'; for example, where data is routinely accessed as 'database records' rather than as integral files, the recryption intercept routines may be modified to respond at the appropriate level of finer granularity. For example, the recryption intercept routines may be modified to respond to database_record-OPEN and database_record-CLOSE requests rather than responding to respective file-OPEN and file-CLOSE requests.

By way of further example, although it is implied above that encryption and decryption are carried out by the CPU 120 or another like processor means in response to the OTF instruction code 163, it is within the contemplation of the invention to alternatively or supplementally use dedicated hardware (and/or firmware) mechanisms for carrying out part or all of one or both the encrypting and decrypting functions. The dedicated hardware can be in the form of a special purpose function board or chip that is operatively coupled to the system bus 110 for carrying out the respective encrypting and decrypting functions.

Similarly other software-implemented functions can be carried out with dedicated hardware as desired. For example, part or all of the data for the collection 165 of encryption and decryption keys and algorithms can be stored in a secured ROM chip or in a secured CD-ROM platter that is operatively coupled to the system bus 110 rather than in the disk subsystem 150. Part or all of the data for the collection 165 of encryption and decryption keys and algorithms can be stored in a separate file-server computer and can be downloaded over a network 105 and through the system I/O module 130 to the system memory 140 on an as needed basis. The various confidential files 161-162, the exclusion and inclusion lists 155-157, the special-use lists 167, and even the OTF instruction code 163 and bubble protection code 154 can be similarly stored in other means and brought into system memory 140 on an as needed basis through various mechanisms such as system I/O module 130 and data conveyance means 131.

Given the above disclosure of general concepts and specific embodiments, the scope of protection sought is to be defined by the claims appended hereto.

What is claimed is:

1. A machine system for protecting information from unauthorized access by way of unauthorized programs, said machine system comprising:
   (a) data-providing means for providing data of an identified one of two or more digital data files, where each of said files is identifiable by a file name;
   (b) an interceptable access mechanism through which data of an identified file of the data-providing means is accessed by identifiable, requesting programs;
   (c) bubble-control means coupled to intercept data access attempts made through said interceptable access mechanism by said identifiable, requesting programs,
   (c.1) wherein the bubble-control means includes deny/approve means, which if active, is provided for testing all the intercepted data access attempts and responsively denying or approving data access to the data of a preclassified subset of said files based on one or both of the identity of one or more access-attempting programs and the time of the access attempt, wherein at least one pre-classified subset of said files has plural files, wherein the deny/approve means further includes:
   list searching means for searching one or more bubble lists, where the bubble lists define a deny or approve decision based on the satisfaction of one or more pre-defined first conditions by the identities of one or more programs that caused the data access attempt and the satisfaction of one or more pre-defined second conditions by the identity of the requested data file,
   wherein the bubble lists include one or more linked trunk_lists, wherein each linked trunk_list has one or more target-query blocks and an end-of-trunk_list marker, wherein each target-query block includes a file-name definition and each target-query block is associated with a corresponding one or more causation-query blocks that each defines a respective query for a cause of the attempted access to the data of a requested data file, wherein each target-query block points to a corresponding causation-query branch list, wherein each causation-query branch list has one or more causation-query blocks and an end-of-branch list marker, wherein each causation-query block has a program-name definition and wherein the list searching means comprises:
   causation-query branch list following means for searching along one or more of the linked causation-query branch lists for a causation-query block having a program-name definition satisfied by the identities of the one or more programs that caused the data access attempt, and wherein the list searching means comprises:

linked-trunk_list following means for searching along one or more of the linked trunk_lists for a target-query block having a file-name definition satisfied by the identity of the requested data file.

2. A machine system according to claim 1 wherein said data-providing means includes:
(a.1) nonvolatile storage means for storing the two or more digital data files.

3. A machine system according to claim 2 wherein:
(a.2) said data-providing means further includes volatile storage means for temporarily storing plaintext data derived from a selected one of the two or more digital data files;
(a.1a) the two or more digital data files stored in said nonvolatile storage means include confidential data portions that are encrypted under a volume-encryption key; and
(d) said machine system further includes volume-encryption means for generating volatile-only plaintext data by decrypting the confidential data portions of a selected one of the digital data files stored in said nonvolatile storage means after approval of access to the selected file by said deny/approve means, and by transmitting the decrypted confidential data exclusively to the volatile storage means.

4. A machine system according to claim 1 wherein:
(b.1) said interceptable access mechanism operates within a dynamically-link loaded environment having portable-executable modules.

5. A machine system according to claim 1 wherein:
(c.2) the bubble-control means intercepts file-OPEN requests made by said identifiable, requesting programs.

6. A machine system according to claim 1 wherein:
(c.2) the bubble-control means posts a security alert message to a network upon denial of a file access request.

7. A machine system according to claim 1 wherein the deny/approve means includes:
(c.1a) extension test means for comparing an extension portion of the name of a requested file with an extensions registry associating such extensions with corresponding programs that use files with such extensions; and
(c.1b) quick-approval means for returning an access approval when the requesting program is associated through the extensions registry with the extension portion of the name of the requested file.

8. A machine system according to claim 1 wherein:
each causation-query block has a master/slave condition field for indicating whether an identified program that caused the data access attempt and satisfies the program-name definition of the causation-query block needs to be a proximate cause of the data access attempt or if it can be a non-proximate cause of the data access attempt; and
the deny/approve means is responsive to said master/slave condition field.

9. A machine system according to claim 1 wherein:
each causation-query block has an alert data field for defining an alert action to be taken or not in the case of a denial; and
the deny/approve means is responsive to said alert data field.

10. A machine system according to claim 1 wherein:
each causation-query block has a deny/approve field for defining whether an access approval or denial decision should be reached in the case of a condition satisfaction between the program-name definition and the identified program that caused the data access attempt; and
the deny/approve means is responsive to said deny/approve field.

11. A machine system according to claim 1 wherein:
each target-query block has a default alert data field for defining a default alert action to be taken or not in the case of a denial; and
the deny/approve means is responsive to said default alert data field.

12. For use in a machine system having a data-providing means that provides data of an identified one of plural digital data files, where each of said files is identifiable by a file name, a machine-implemented method for protecting the information of said files from unauthorized access by way of unauthorized ones of identifiable programs, said method comprising the steps of:
(a) intercepting data access attempts made by access requesting programs for data in an identified one of said files;
(b) first testing each intercepted data access attempt for satisfaction of a first predefined, classifying condition that classifies one or both of the identity of one or more of the access requesting programs and the time of the access request;
(c) second testing each intercepted data access attempt for satisfaction of a second predefined, classifying condition that classifies the identity of the requested file, wherein at least one said second predefined, classifying condition classifies the identities of plural ones of the digital data files, wherein the second testing further comprises searching one or more bubble lists, where the bubble lists define a deny or approve decision based on the satisfaction of one or more pre-defined first conditions by the identities of one or more programs that caused the data access attempt and the satisfaction of one or more pre-defined second conditions by the identity of the requested file,
wherein the bubble lists include one or more linked trunk_lists, wherein each linked trunk_list has one or more target-query blocks and an end-of-trunk_list marker, wherein each target-query block includes a file-name definition and each target-query block is associated with a corresponding one or more causation-query blocks that each defines a respective query for a cause of the attempted access to the data of a requested file, wherein each target-query block points to a corresponding causation-query branch list, wherein each causation-query branch list has one or more causation-query blocks and an end-of-branch list marker, wherein each causation-query block has a program-name definition and wherein the second testing further comprises:
searching along one or more of the linked causation-query branch lists for a causation-query block having a program-name definition satisfied by the identities of the one or more programs that caused the data access attempt, and wherein the second testing further comprises searching along one or more of the linked trunk_lists for a target-query block having a file-name definition satisfied by the identity of the requested file; and
(d) in response to said first and second testing steps, denying or approving access to the data of the requested file.

13. A machine-implemented method according to claim 12 wherein:
(a.1) said intercepting step occurs within a dynamically-link loaded environment having portable-executable modules.

14. A machine-implemented method according to claim 12 wherein said first testing step includes:

(b.1) matching of the identity of at least one of the access requesting programs with a pre-defined first causation-classifying query.

15. A machine-implemented method according to claim 14 wherein said first testing step includes:
(b.2) matching of the identity of the at least one access requesting program with a predefined level of responsibility for causing the corresponding data access attempt to be made.

16. A machine-implemented method according to claim 15 wherein said predefined level of responsibility is either MASTER or SLAVE.

17. A machine-implemented method according to claim 12 wherein said first predefined, classifying condition of the first testing step calls for:
(b.1) classifying a combination of plural programs as being responsible for the access request wherein a first such program is classified as a MASTER and the other is classified as a SLAVE of the first program.

18. A machine-implemented method according to claim 12 wherein said second testing step includes:
(c.1) a target-query test that classifies the identity of the requested file according to whether that identity satisfies a predefined second search query.

19. A machine-implemented method according to claim 12 wherein
(d.1) an affirmative satisfaction of said first and second testing steps logically links to a specific one of an access DENY and an access APPROVE action; and
(d.2) nonsatisfaction of said first and second testing steps logically links to a default access denial action.

20. A machine-implemented method according to claim 19 wherein
(d.3) if an affirmative satisfaction of said first and second testing steps logically links to a specific access DENY action, a corresponding logical link is further established to a specific alert action that is associated with the specific access DENY action.

21. A machine-implemented method according to claim 20 wherein
(d.4) if nonsatisfaction of said first and second testing steps occurs, a corresponding logical link is further established to a default alert action that is associated with the corresponding default access denial action.

22. A machine-implemented method according to claim 21 further comprising the step of:
(e) in response to a denial of the requested access, posting a correspondingly-leveled security alert message for alerting correspondingly responsible entities of the access attempt and denial so that such responsible entities can take appropriate responsive action.

23. A machine-implemented method according to claim 22 wherein
(e.1) in accordance with a prespecified level for the to-be posted security alert message, said posting is to a corresponding one or more of:
(e.1a) a local terminal of a machine that originated the denied request for access;
(e.1b) a local network of the machine that originated the denied request for access; and
(e.1c) an enterprise wide network of the machine that originated the denied request for access, said enterprise wide network being larger than and including said local network.

24. An instruction conveying apparatus for operatively instructing a predefined, instructable machine to carry out bubble protection actions, said bubble protection actions comprising:
(a) intercepting a data access request caused by one or more causation-sourcing events for access to targeted data having a unique identity;
(b) first testing the identity of the targeted data for satisfaction of a predefined target classifying condition, wherein at least one predefined target classifying condition covers plural ones of said targeted data that have corresponding, unique identities, wherein the first testing further comprises searching one or more bubble lists, where the bubble lists define a deny or approve decision based on the satisfaction of one or more pre-defined first conditions by the identities of one or more programs that caused the data access attempt and the satisfaction of one or more pre-defined second conditions by the identity of the requested file,
wherein the bubble lists include one or more linked trunk_lists, wherein each linked trunk_list has one or more target-query blocks and an end-of-trunk_list marker, wherein each target-query block includes a file-name definition and each target-query block is associated with a corresponding one or more causation-query blocks that each defines a respective query for a cause of the attempted access to the data of a requested file, wherein each target-query block points to a corresponding causation-query branch list, wherein each causation-query branch list has one or more causation-query blocks and an end-of-branch list marker, wherein each causation-query block has a program-name definition, and wherein the first testing further comprises searching along one or more of the linked trunk_lists for a target-query block having a file-name definition satisfied by the identity of the requested file;
(c) second testing at least one of the identity of the one or more causation sourcing events or the locations of the one or more causation-sourcing events or the timing of the corresponding data access request for satisfaction of a predefined causation classifying condition, wherein the second testing further comprises:
searching along one or more of the linked causation-query branch lists for a causation-query block having a program-name definition satisfied by the identities of the one or more programs that caused the data access attempt; and
(d) in response to said first and second testings, approving or denying the intercepted data access request.

25. The instruction conveying apparatus of claim 24 wherein said bubble protection actions further comprise:
(e) in response to a denial based on said first and second testings, posting an alert message for alerting correspondingly responsible entities of the access attempt and denial so that such responsible entities can take appropriate responsive action.

26. The instruction conveying apparatus of claim 24 wherein
(b.1) said predefined target classifying condition includes wild card designations for classifying the identity of the plural ones of said targeted data.

27. The instruction conveying apparatus of claim 24 wherein
(c.1) said predefined causation classifying condition includes wild card designations for classifying the identity of a tested causation event.

28. The instruction conveying apparatus of claim 24 wherein
- (c.1) said predefined causation classifying condition includes one or more timing classifications selected from the group consisting of: day of a week, time of day, day of a month, month of a year, and year.

29. The instruction conveying apparatus of claim 24 wherein
- (c.1) said predefined causation classifying condition includes combinatorial logic operators at least for defining AND and OR combinations of conditions to be satisfied.

30. The machine system of claim 1 wherein:
- (c.1a) said deny/approve means responsively denies or approves data access to the data of the pre-classified subset of files based on both the identity of one or more of the access-attempting programs and on the time of the access attempt.

31. The machine system of claim 1 wherein:
- (c.1a) said deny/approve means responsively denies or approves data access to the data of the pre-classified subset of files based further on a spatial causation attribute selected from the group consisting of:
- (c.1a1) geographic execution location of the request-causing program;
- (c.1a2) serial number of a machine in which the request-causing program executes; and
- (c.1a3) machine name of a machine in which the request-causing program executes.

32. The machine system of claim 31 wherein said deny/approve means includes:
- (c.1a2') serial number range testing means for testing whether the serial number of the machine in which the request-causing program executes lies within a pre-defined range of serial numbers.

33. The machine system of claim 6 wherein:
- (c.2a) said security alert message is distributed across the network in accordance with a seriousness attribute that indicates a seriousness level for the corresponding denial to the file access request.

34. A machine system for protecting in-file information from unauthorized access through unauthorized entities making access-opening attempts at potentially unauthorized times and/or from potentially unauthorized locations, said machine system comprising:
- (a) data-providing means for providing data of an identified one of plural digital data files, where each of said files is identifiable by a unique file pathname;
- (b) system memory into which executable code can be stored;
- (c) an interceptable, data-access providing mechanism through which data of identified files of the data-providing means can be opened for access by data-requesting programs;
- (c) bubble-control means coupled to intercept file-opening attempts made through said interceptable access mechanism by said data-requesting programs,
- (c.1) wherein the bubble-control means includes deny/approve means, which if active, is provided at least partially within said system memory and is used for testing all the intercepted file-opening attempts and responsively denying or approving opening of access to the data of a predefined one or more classes of said files based on membership of the identified files in one pre-defined classes of files and further based on one or more of:
  - (c.1a) the identity of one or more programs that are directly or indirectly responsible for the making of the access-attempt;
  - (c.1b) the origination time of the access attempt;
  - (c.1c) the respective geographic execution locations of one or more programs which are directly or indirectly causing the making of the access-attempt;
  - (c.1d) the respective serial numbers of one or more machines executing one or more of the programs which are directly or indirectly causing the making of the access-attempt; and
  - (c.1e) the respective names of one or more machines executing one or more of the programs which are directly or indirectly causing the making of the access-attempt;
- wherein at least one said predefined classes of files has plural members, wherein the deny/approve means further includes:
- list searching means for searching one or more bubble lists, where the bubble lists define a deny or approve decision based on the satisfaction of one or more pre-defined first conditions by the identities of one or more programs that caused the data access attempt and the satisfaction of one or more pre-defined second conditions by the identity of the requested data file,
- wherein the bubble lists include one or more linked trunk_lists, wherein each linked trunk_list has one or more target-query blocks and an end-of-trunk_list marker, wherein each target-query block includes a file-name definition and each target-query block is associated with a corresponding one or more causation-query blocks that each defines a respective query for a cause of the attempted access to the data of a requested data file, wherein each target-query block points to a corresponding causation-query branch list, wherein each causation-query branch list has one or more causation-query blocks and an end-of-branch list marker, wherein each causation-query block has a program-name definition and wherein the list searching means comprises:
- causation-query branch list following means for searching along one or more of the linked causation-query branch lists for a causation-query block having a program-name definition satisfied by the identities of the one or more programs that caused the data access attempt, and wherein the list searching means comprises:
- linked-trunk_list following means for searching along one or more of the linked trunk_lists for a target-query block having a file-name definition satisfied by the identity of the requested data file.

35. The machine system of claim 34 wherein:
- (c.1a1) said identity of the one or more programs is defined by a class-defining query specification provided within said machine system.

36. The machine system of claim 34 wherein:
- (c.1a1) said identity of the one or more programs includes an access-type indication which indicates that the identified one or more programs can be indirectly responsible for the making of the access-attempt by virtue of having invoked a slave program to cause the making of the access-attempt.

37. The machine system of claim 34 wherein:

(c.1a1) said identity of the one or more programs includes an access-type indication which indicates that the identified one or more programs must be directly responsible for the making of the access-attempt rather than having caused the making of the access-attempt by virtue of having invoked one or more slave programs to cause the making of the access-attempt.

38. The machine system of claim 34 wherein:

(c.1b1) said origination time of the access attempt is defined by a temporal class-defining query specification provided within said machine system.

39. The machine system of claim 38 wherein:

(c.1b2) said temporal class-defining query specification identifies a temporal range according to days of the week.

40. The machine system of claim 38 wherein:

(c.1b2) said temporal class-defining query specification identifies a temporal range according to hours and/or minutes of the day.

41. The machine system of claim 38 wherein:

(c.1b2) said temporal class-defining query specification identifies a temporal range according to a calendar date.

42. The machine system of claim 34 wherein:

(c.1d1) said respective serial numbers are defined by an indicator indicating a range of serial numbers, where said serial numbers range indicator is provided within said machine system.

\* \* \* \* \*